US009491116B2

(12) United States Patent
Pugh

(10) Patent No.: US 9,491,116 B2
(45) Date of Patent: Nov. 8, 2016

(54) DYNAMIC MANAGEMENT OF GROUPS FOR ENTITLEMENT AND PROVISIONING OF COMPUTER RESOURCES

(71) Applicant: VMware, Inc., Palo Alto, CA (US)

(72) Inventor: William Pugh, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/617,485

(22) Filed: Feb. 9, 2015

(65) Prior Publication Data
US 2015/0156139 A1 Jun. 4, 2015

Related U.S. Application Data

(62) Division of application No. 13/459,028, filed on Apr. 27, 2012, now Pat. No. 8,955,151.

(60) Provisional application No. 61/481,184, filed on Apr. 30, 2011.

(51) Int. Cl.
*H04L 12/24* (2006.01)
*H04L 12/911* (2013.01)
(Continued)

(52) U.S. Cl.
CPC .......... *H04L 47/828* (2013.01); *G06F 21/604* (2013.01); *G06F 21/6218* (2013.01); *H04L 41/0873* (2013.01); *G06F 2221/2141* (2013.01); *G06F 2221/2145* (2013.01)

(58) Field of Classification Search
CPC ............. H04L 47/828; H04L 41/0873; G06F 21/604; G06F 21/6218; G06F 2221/2141
USPC .......................................................... 709/225
See application file for complete search history.

(56) References Cited

U.S. PATENT DOCUMENTS 3,660,823 A 5/1972 Recks
4,924,408 A 5/1990 Highland
(Continued)

FOREIGN PATENT DOCUMENTS

EP 0697662 2/1996
EP 0697662 A1 * 2/1996 ........... G06F 21/604
(Continued)

OTHER PUBLICATIONS

Bayardo, "Constraint-Based Rule Minin in Large, Dense Databases", Proceedings of the 15th International Conference on Data Engineering, pp. 188-197, 1999, 10 pages.*
(Continued)

Primary Examiner — Andrew Nalven
Assistant Examiner — Walter Malinowski

(57) ABSTRACT

Methods, systems, and techniques for managing groups of entities, such as individuals, employees, or systems, and providing entitlement and access to computer resources based on group membership are provided. Example embodiments provide a Group Management System having a Group Management Engine "GME," an Entitlement Engine, and a Provisioning Engine, which work together to allow simplified grouping of entities and providing entitlement and access to the entities based upon the group membership. In one embodiment, the GME leverages dynamic programming techniques to enable accurate, scalable systems that can manage near real time updates and changes to the group's status or to the entities' status. These components cooperate to enable provisioning of applications based upon current entitlement.

19 Claims, 11 Drawing Sheets

(51) Int. Cl.
*G06F 21/60* (2013.01)
*G06F 21/62* (2013.01)

(56) References Cited

U.S. PATENT DOCUMENTS

| | | | | |
|---|---|---|---|---|
| 5,305,424 | A * | 4/1994 | Ma | G06N 5/048 706/1 |
| 5,537,514 | A * | 7/1996 | Nishidai | G06N 5/048 706/52 |
| 5,583,762 | A * | 12/1996 | Shafer | G06F 17/218 715/239 |
| 5,911,143 | A * | 6/1999 | Deinhart | G06F 21/604 |
| 6,065,001 | A | 5/2000 | Ohkubo et al. | |
| 6,167,445 | A | 12/2000 | Gai et al. | |
| 6,278,997 | B1 * | 8/2001 | Agrawal | G06F 17/30539 |
| 6,339,770 | B1 * | 1/2002 | Leung | G06F 17/30454 |
| 6,421,700 | B1 | 7/2002 | Holmes et al. | |
| 6,519,571 | B1 | 2/2003 | Guheen et al. | |
| 6,560,594 | B2 * | 5/2003 | Cochrane | G06F 17/30333 |
| 6,708,170 | B1 | 3/2004 | Byrne et al. | |
| 7,003,360 | B1 * | 2/2006 | Dillon | G06F 17/50 700/103 |
| 7,076,795 | B2 | 7/2006 | Hahn | |
| 7,103,784 | B1 * | 9/2006 | Brown | H04L 63/105 713/151 |
| 7,185,192 | B1 * | 2/2007 | Kahn | G06F 21/6218 707/999.003 |
| 7,448,022 | B1 | 11/2008 | Ram et al. | |
| 7,546,281 | B2 | 6/2009 | Corl et al. | |
| 7,644,432 | B2 * | 1/2010 | Patrick | H04L 63/20 713/150 |
| 7,774,365 | B2 | 8/2010 | Oxenstierna et al. | |
| 7,844,561 | B2 * | 11/2010 | Kaminsky | G06N 5/025 706/45 |
| 8,145,633 | B1 * | 3/2012 | Manolis | G06Q 30/0627 705/26.63 |
| 8,234,335 | B1 | 7/2012 | Haldar et al. | |
| 8,346,788 | B1 | 1/2013 | Kim et al. | |
| 8,429,708 | B1 * | 4/2013 | Tandon | G06F 21/31 380/247 |
| 9,009,167 | B2 * | 4/2015 | Cerny | G06F 17/30867 705/6 |
| 2002/0062245 | A1 * | 5/2002 | Niu | G06Q 30/02 705/14.51 |
| 2002/0118287 | A1 * | 8/2002 | Grosvenor | G06T 13/80 348/222.1 |
| 2002/0138460 | A1 * | 9/2002 | Cochrane | G06F 17/30333 |
| 2002/0138577 | A1 * | 9/2002 | Teng | G06F 21/41 709/205 |
| 2002/0178119 | A1 * | 11/2002 | Griffin | G06F 21/604 705/54 |
| 2003/0061216 | A1 * | 3/2003 | Moses | G06F 21/6218 |
| 2003/0105974 | A1 * | 6/2003 | Griffin | G06F 17/30581 726/6 |
| 2003/0162537 | A1 * | 8/2003 | Hirsch | H04L 41/022 455/423 |
| 2003/0217332 | A1 * | 11/2003 | Smith | G06Q 30/02 715/234 |
| 2004/0024764 | A1 * | 2/2004 | Hsu | G06F 21/31 |
| 2004/0103236 | A1 * | 5/2004 | Yoneda | G11C 15/00 711/1 |
| 2004/0230679 | A1 * | 11/2004 | Bales | G06F 17/3089 709/225 |
| 2005/0027713 | A1 * | 2/2005 | Cameron | H04L 63/083 |
| 2005/0060572 | A1 | 3/2005 | Kung et al. | |
| 2005/0137998 | A1 * | 6/2005 | Betts | G06F 17/2247 |
| 2005/0198231 | A1 * | 9/2005 | Gasca, Jr. | G06F 9/5061 709/221 |
| 2005/0198382 | A1 | 9/2005 | Salmi et al. | |
| 2005/0246302 | A1 * | 11/2005 | Lorenz | G06N 5/025 706/47 |
| 2006/0150256 | A1 | 7/2006 | Fanton et al. | |
| 2006/0190804 | A1 * | 8/2006 | Yang | G06F 17/248 715/236 |
| 2006/0288021 | A1 * | 12/2006 | Kojima | G06F 17/2205 |
| 2007/0106655 | A1 | 5/2007 | Petri et al. | |
| 2007/0174866 | A1 * | 7/2007 | Brown | H04N 7/17318 725/28 |
| 2007/0239859 | A1 | 10/2007 | Wilkinson et al. | |
| 2007/0242827 | A1 * | 10/2007 | Prafullchandra | G06F 21/6218 380/241 |
| 2008/0040775 | A1 | 2/2008 | Hoff et al. | |
| 2008/0060058 | A1 * | 3/2008 | Shea | G06F 21/604 726/4 |
| 2008/0077809 | A1 * | 3/2008 | Hayler | G06F 12/1466 713/193 |
| 2008/0098045 | A1 | 4/2008 | Radhakrishnan et al. | |
| 2008/0184130 | A1 | 7/2008 | Tien et al. | |
| 2008/0215518 | A1 * | 9/2008 | Matsuda | H04L 63/0263 706/47 |
| 2008/0216148 | A1 | 9/2008 | Bienek et al. | |
| 2008/0235231 | A1 | 9/2008 | Gass et al. | |
| 2008/0263678 | A1 | 10/2008 | Kroll | |
| 2009/0006331 | A1 | 1/2009 | Fuxman et al. | |
| 2009/0007219 | A1 | 1/2009 | Abzarian et al. | |
| 2009/0019000 | A1 * | 1/2009 | Arends | G06F 17/3051 |
| 2009/0034696 | A1 * | 2/2009 | Ramanathan | H04L 12/58 379/88.17 |
| 2009/0040020 | A1 * | 2/2009 | Moyle | G06F 21/554 340/5.74 |
| 2009/0044256 | A1 * | 2/2009 | Moyle | G06F 21/55 726/4 |
| 2009/0070771 | A1 | 3/2009 | Yuyitung et al. | |
| 2009/0106207 | A1 | 4/2009 | Solheim et al. | |
| 2009/0165078 | A1 * | 6/2009 | Samudrala | G06F 21/604 726/1 |
| 2009/0178106 | A1 | 7/2009 | Feng et al. | |
| 2009/0198777 | A1 | 8/2009 | Lafreniere et al. | |
| 2009/0217341 | A1 * | 8/2009 | Sun | H04L 63/1416 726/1 |
| 2009/0265495 | A1 | 10/2009 | Murayama et al. | |
| 2009/0287933 | A1 | 11/2009 | Beckwith et al. | |
| 2009/0299949 | A1 * | 12/2009 | Tan | G06N 5/025 706/59 |
| 2009/0313297 | A1 * | 12/2009 | Hsu | G06F 17/30017 |
| 2009/0316698 | A1 * | 12/2009 | Menten | H04L 47/10 370/392 |
| 2009/0328132 | A1 * | 12/2009 | Renfro | G06F 21/604 726/1 |
| 2010/0011027 | A1 * | 1/2010 | Cox | G06Q 10/06 707/E17.005 |
| 2010/0011305 | A1 | 1/2010 | Ullom et al. | |
| 2010/0042973 | A1 * | 2/2010 | Anderson | G06F 21/6218 717/120 |
| 2010/0063869 | A1 | 3/2010 | Kriss | |
| 2010/0153932 | A1 | 6/2010 | McMurtry et al. | |
| 2010/0217737 | A1 * | 8/2010 | Shama | G06Q 10/06 706/47 |
| 2010/0228538 | A1 * | 9/2010 | Yamada | G06F 17/27 704/9 |
| 2010/0235885 | A1 * | 9/2010 | Persson | G06F 21/629 726/4 |
| 2010/0281513 | A1 * | 11/2010 | Richards | G06F 21/604 726/1 |
| 2010/0287158 | A1 | 11/2010 | Toledano et al. | |
| 2010/0311385 | A1 | 12/2010 | Hurwitz | |
| 2010/0325161 | A1 | 12/2010 | Rutter et al. | |
| 2011/0047206 | A1 * | 2/2011 | Spears | G06F 21/604 709/203 |
| 2011/0051906 | A1 * | 3/2011 | Cioffi | H04B 3/32 379/32.04 |
| 2011/0055777 | A1 | 3/2011 | Tremaine et al. | |
| 2011/0093925 | A1 * | 4/2011 | Krishnamoorthy | G06F 21/6218 726/4 |
| 2011/0125802 | A1 | 5/2011 | Van der Merwe et al. | |
| 2011/0208703 | A1 * | 8/2011 | Fisher | G06F 17/30938 707/692 |
| 2011/0225628 | A1 * | 9/2011 | Hirose | G06F 17/243 726/3 |
| 2011/0252073 | A1 | 10/2011 | Pauly | |
| 2012/0047575 | A1 * | 2/2012 | Baikalov | G06F 21/577 726/21 |

(56) References Cited

U.S. PATENT DOCUMENTS

| | | | |
|---|---|---|---|
| 2012/0051219 A1 | 3/2012 | Hart | |
| 2012/0166484 A1* | 6/2012 | McGregor | G06F 19/3443 |
| | | | 707/776 |
| 2012/0314605 A1* | 12/2012 | Akiyoshi | H04L 45/30 |
| | | | 370/252 |

FOREIGN PATENT DOCUMENTS

| | | | | |
|---|---|---|---|---|
| EP | 1895446 | | 3/2008 | |
| JP | 08-087454 | | 4/1996 | |
| JP | 08087454 A | * | 4/1996 | |
| JP | 2010-117885 | | 5/2010 | |
| JP | 2010117885 A | * | 5/2010 | |
| WO | WO 02097591 | | 12/2002 | |
| WO | WO 03036505 | | 5/2003 | |
| WO | WO 03107224 | | 12/2003 | |
| WO | WO 03107224 A1 * | 12/2003 | | G06F 21/31 |
| WO | WO 2012151132 A1 * | 11/2012 | | G06F 21/604 |

OTHER PUBLICATIONS

Chantrapornchai, "Minimization of Fuzzy Systems based on Fuzzy Inference Graphs", Research report: TR-96-6, Department of Computer Science and Engineering, University of Notre Dame, 1996, 19 pages.*
Debar, "Using contextual security policies for threat response", France Telecom, 2006, 20 pages.*
Shapiro, "Concurrent Prolog: A Progress Report", Apr. 1986, IPCOM000148873D, 40 pages.*
Gopalakrishnan, "Cloud Computing Identity Management", SETLabs Briefings, vol. 7, No. 7, 2009, pp. 45-54.
Active Directory Architecture; http://technet.microsort.com/en-us/library/bb727030(d=printer).aspx. Printed Aug. 10, 2012; 41 pages.
K. Zeilenga. *Lighweight Directory Access Protocol (LDAP): Technical Specification Road Map*, http://tools.ietf.org/html/rfc4510; Copyright the Internet Society 2006; Category Standards Track; OpenLDAP Foundation; Printed Aug. 10, 2012; 7 pages.
A Brief Introduction to XACML; Last Updated Mar. 14, 2003. https://www.oasis-open.org/committees/download.php/2713/Brief_Introd; Printed Aug. 10, 2012; 3 pages.
European Office Action received in copending European Patent Application No. 12 722 225.5. Received Jan. 15, 2016. 5 pages.
Japanese Office Action received in copending Japanese Patent Application No. 2014-508160. Received Feb. 23, 2016. 5 pages.

* cited by examiner

DYNAMIC MANAGEMENT OF GROUPS FOR ENTITLEMENT AND PROVISIONING OF COMPUTER RESOURCES

CROSS-NOTING TO RELATED APPLICATIONS

This application is a divisional of, and claims priority to, U.S. patent application Ser. No. 13/459,028, entitled "DYNAMIC MANAGEMENT OF GROUPS FOR ENTITLEMENT AND PROVISIONING OF COMPUTER RESOURCES," filed on Apr. 27, 2012. This Application claims the benefit of U.S. Provisional Application No. 61/481,184, entitled "RULE-BASED APPROACH FOR MANAGING USER ACCESS TO APPLICATIONS INCLUDING SOFTWARE SERVICES," filed on Apr. 30, 2011. The disclosure of the foregoing applications are incorporated here by reference.

TECHNICAL FIELD

The present disclosure relates to methods, techniques, and systems for managing groups of entities, including people and computer systems, and for providing entitlement and access to computer resources to members of the groups and, in particular, to methods, techniques, and systems for providing efficient and nearly instantaneous updates to membership conditions for groups and for individual entities, even in a large scale environment.

BACKGROUND

Today's world demands that administering entitlements and access to computer resources be efficient, accurate, and secure. As more and more computing is done remotely, and as organizations grow in size and complexity, these challenges continue to grow. Multiple waves of technology have left most organizations with IT infrastructure that is complex, inflexible, and expensive to run. People, devices and applications are tightly coupled making it difficult to roll out new applications or support new work patterns. IT organizations within corporations have to manage a hundreds if not thousands of applications, based on divergent technologies, and run thousands of PCs and servers, each with its own operating requirements and idiosyncrasies.

Maintaining software on a distributed PC or other access device is expensive and time-consuming. As the number of applications and services provided through the PC grow, the complexity of the PC configuration increases.

Historically this problem has been addressed by 'locking down' the PC to limit the changes that can be made to it. Products have also been introduced to 'push' software to physical devices but these approaches depend on there being a small, well-defined number of access devices as well as a relatively infrequent update cycle. Until a few years ago this was difficult but achievable in a well-managed environment. However, an explosion in the number and type of access devices (which now encompass devices such as PCs, laptops, PDAs and mobile phones) combined with a need for frequent, real-time updates (e.g., to protect against viruses, worms and security loopholes) has rendered such an approach unworkable.

In large organizations, the problem of access device diversity is compounded by the fact that end users use applications that run on many different platforms. Some run on the user's PC, some run centrally as terminal applications, thin clients or web services and some run on virtual machine technology. Previously, the infrastructure for supporting and managing these applications was entirely separate.

DETAILED DESCRIPTION

Figure 1:
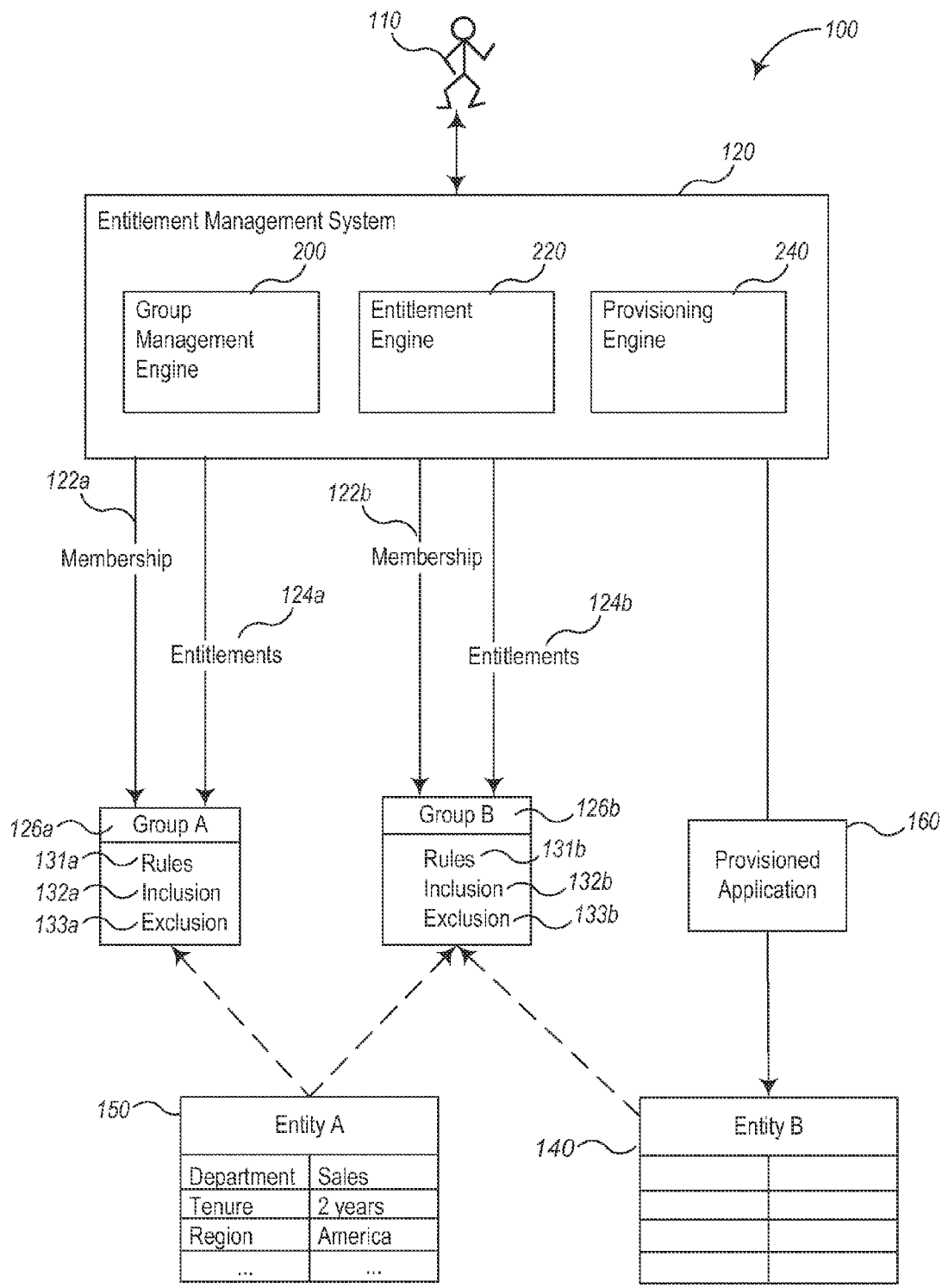
FIG. 1 is an overview block diagram of an example Entitlement Management System.

Embodiments described herein provide enhanced computer- and network-based methods and systems for efficiently, accurately, and securely granting access to computer resources to entities based on group membership. Example embodiments provide an Entitlement Management System ("EMS"), which enables users, such as IT managers, administrative users, or the like, to grant entitlement to and provision computer resources according to end-user (or other entity) membership in the groups in "near" real time. That is, as the needs of, for example, an organization change, the changes to the group membership are reflected almost immediately using separate synchronization processes (executable threads, or the like), so that the computer resources a user is entitled to, and provisioning of such resources is kept current virtually instantaneously without a lot of administrative overhead. Group membership can be based upon end-user roles within the organization and not potentially arbitrary and soon out-of-date access control lists. As an end-user's role within the organization changes, the groups that the end-user belongs to are quickly updated. With little delay, the computer resources then available to that end-user are also updated automatically so that access and security needs can be maintained. Moreover, the techniques used by the EMS are independent of the target device or of the computer resource being provisioned. Thus, the ability for an EMS to manage entitlements and provision applications and other software using these techniques improves the ability for administrators to ensure access integrity across the infrastructure regardless of the type of application (e.g., local application, virtualized application, software as a service, etc.), device, or entity being administered. As used herein, groups can comprise people, computer systems, or a combination thereof. Also as used herein, distinction is not made between the users that may manage the EMS groups (e.g., administrators, managers or other users) or the end-users or other entities receiving access to resources unless otherwise indicated, as in some embodiments the users who receive access may also administer the system.

In example embodiments, an EMS comprises a set of tools including a Group Management Engine, an Entitlement Engine, and a Provisioning Engine. The Group Management Engine ("GME") receives information about the entities and one or more rules which define membership in one or more groups and generates tables that correlate users with groups. In an example embodiment, the rules are logic clauses requiring certain criteria for membership in the respective group. The Entitlement Engine ("EE") receives information from the GME (that the GME keeps current) and generates tables that correlate users with appropriate resource (e.g., application) entitlements based upon group membership, without requiring individual user entitlements. The Provisioning Engine ("PE") receives information from the EE (that the EE keeps current) and provisions the appropriate computer resources to the entities, again based upon their group membership.

In some embodiments the EMS is structured such that the operation of the various components is visible to the user (e.g., the administrator). In other embodiments the components of the EMS operate together without requiring the user to directly observe or instruct the various components. The components of the EMS can be linked together to propagate changes to the user information, group information, or entitlement information automatically.

In some embodiments the Group Management Engine of the EMS includes an analysis and refactoring component that analyzes the rules in the group definitions for inefficiencies, inaccuracies, logical conflicts, or other problems, and refactors the rules to minimize or eliminate problems. The analysis component can analyze the group definitions empirically by looking at the results of executing the group definition, or theoretically by analyzing the rules themselves independent of the results of applying the rules to a given set of entities.

The EMS simplifies the task of managing which entities have access to which computer resources by removing the need to change a given entity's access when circumstances change. If an entity's status changes, this change is input to entity (e.g., user) data tables of the EMS and the appropriate computer resource entitlement and provisioning are automatically generated. For example, if an employee is fired, the manager simply makes note of the change in status (e.g., in an appropriate data structure) and the prior employee's access to computer resources based upon his role as an employee are automatically revoked when the EMS updates the tables.

FIG. 1 is an overview block diagram of an example Entitlement Management System. In computing environment 100, a user 110, such as an IT manager or other administrator, can interact with an EMS 120 to grant (e.g., give, assign, set, or the like) membership 122a-b and entitlements 124a-b to one or more groups 126a-126b. Based on the group definitions and the entities' membership in the one or more groups, the EMS 120 can deliver one or more fully provisioned application (or other computing resources) to the entities.

As mentioned, the EMS 120 accomplishes these tasks using various components, including a Group Management Engine ("GME") 200, an Entitlement Engine ("EE") 220, and a Provisioning Engine ("PE") 240. The GME 200 receives information describing various entities and one or more group definitions and uses this information to manage group membership. Each group 126a-b comprises a set of group composition rules 131a-b ("GCRs"), an included entities list 132a-b, and an excluded entities list 133a-b. Each GCR includes one or more logic clauses that define membership in the group. For example, the logic clauses may comprise conjunctive or disjunctive properties or attributes that need be met in order to be included in (or excluded from) the group. The lists of included and excluded entities (e.g., lists 132a and 132b) can be given greater or lesser priority than the GCRs, or can be represented as GCRs listing single entities for inclusion or exclusion. The members of the groups can be entities, such as entity 140 and entity 150, including people, computer resources, systems, or some combination thereof.

The GME 200 can store data pertaining to the entities 140 and 150, as, for example, a set of name-value pairs, which is used to determine whether a given entity is a member of the group when the logic clauses are evaluated. An example entity, Entity A 150, is shown having various attributes stored as name/value pairs, such as "Department—Sales," "Tenure—2 years," and "Region—North America." Virtually any suitable attribute of the entity 150 can be stored and used to determine group membership. For example, suppose that Group A 126a is defined as including entities that are employees who are in sales, and excluding people with less than one year with the organization. As illustrated, Entity A 150 meets both criteria since the entity (an employee) has been in the sales department for 2 years and works in North America, and is therefore a member of Group A 126a. As another example, suppose that Group B 126b is defined as people who have been with the organization for 2 years or more. As illustrated in FIG. 1, the Entity A 150 is a member of that group as well.

Membership in one or more of the groups 126a-b also can be used as a criteria for defining membership in another group. For example, suppose that a third group is defined as including those entities who belong to Group A 126a but who do not belong to Group B 126b. Entity A 150 discussed in the above example, who is a member of both groups 126a and 126b fails to satisfy or meet this criteria and therefore is excluded from the third group. The logic clauses can therefore be as complex or as simple as occasion presents and as needed by the organization.

Once the desired groups are defined, the administrator 110 can assign entitlements 124a-b to the groups 126a-b based on the definition of the group and the subscription, licenses, or other attributes of the computer resources being provisioned. The members of the groups that receive such entitlements are then able to access the computer resource once the resource is provisioned. The Entitlement Engine 220 oversees assigning entitlements to the different groups 126a-b. Different members of an organization may have different needs for certain software or hardware resources for the organization, and the EE 220 permits the administrator 110 to track employees and grant access appropriately and easily.

The Provisioning Engine 240 then provisions the computer resources (for example, applications) to the various entities 140 and 150 based upon the entitlements 124a-b assigned to groups 126a-b. Thus, for example, if Group B has been entitled to use a particular application, then provisioned application 160 may be provisioned by the PE 240 to both Entity A 150 and Entity B 140.

Figure 2:
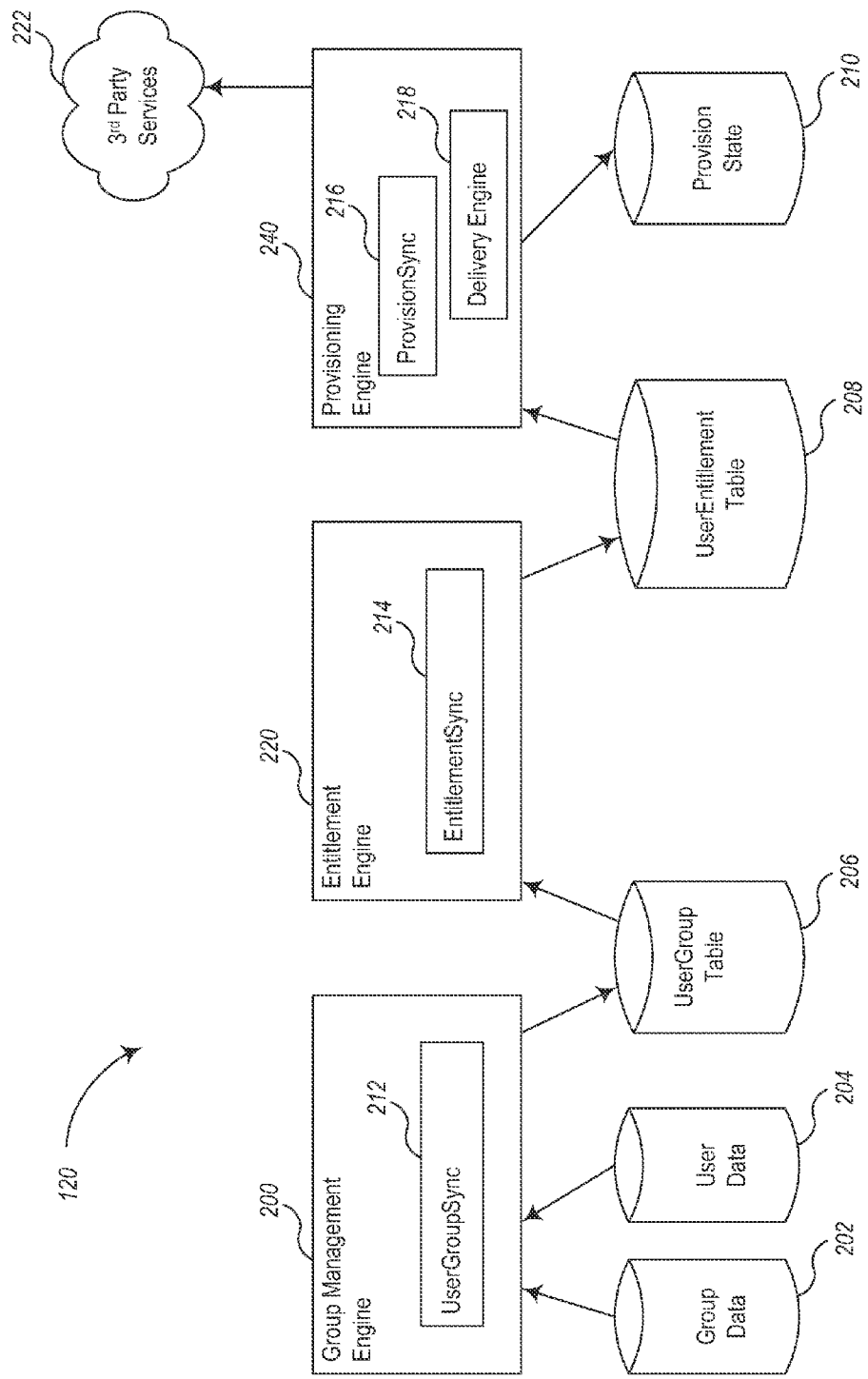
FIG. 2 is an example block diagram of the components of an example embodiment of an Entitlement Management System.

FIG. 2 is an example block diagram of the components of an example embodiment of an Entitlement Management System. As described with respect to FIG. 1, the EMS 120 includes a GME 200, an EE 220, and a PE 240. The GME 200 communicates with data repositories Group Data 202 and User Data 204 to determine attributes regarding users and to determine the logic defining group membership. The Group Data repository 202 stores information describing the group definitions, such as the GCRs, include, and exclude lists. The User Data repository 204 contains data describing the entities, such as the name/value pairs described above.

The components of the EMS 120 each contain one or more processes (which in different embodiments may be implemented as processes, tasks, threads, or other executable code) to synchronize the data tables. In particular, the GME 200 includes a process called UserGroup Sync 212 which creates or updates a UserGroup table 206 triggered by changes and/or additions to the Group Data repository 202 or the User Data repository 204. In some embodiments, the UserGroup table includes a flat list of entities and the groups they belong to, for easily and quickly reflecting changes to group membership. Of note, although referred to herein as "tables," other data structures may be used to store equivalent information such as files, lists, or the like. Also, although described with reference in some examples to data bases, other means for storing and querying information may be similarly incorporated. The EE 220 includes an EntitlementSync process 214 that, in combination with entitlement data, automatically generates or updates a UserEntitlement table 208, triggered by changes to the UserGroup table 206. The UserEntitlement table 208 is a flat list of entities and the computer resources to which users are entitled. The PE 240 includes a ProvisionSync process 216, which generates or updates a Provision State table 210 describing the state of the entities and the computer resources to which the entities are entitled, and a method of provisioning the computer resources to the entities. Changes to the Provision State table 210 are automatically triggered by changes to the UserEntitlement Table 208. The PE 240 may also include a DeliveryEngine process 218 that executes the provisioning of a resource according to the Provision State table 210. The PE 240 may also communicate and cooperate with third party services 222 to provision the computer resources (for example, a software as a service, "SaaS" application). Accordingly, the EMS 120 receives changes to a user's status or a group's status and propagates the changes through the system to generate flat tables that describe to which computer resources a given entity is entitled. An administrator can then perform certain management tasks with ease, such as querying "which computer resources does entity X have access to?" or "which entities are members of Y group?" or "which entities have access to Z computer resource?"

Once the tables are created, they may be used to directly and efficiently determine entitlement and provisioning information with or without regard to group membership. In some embodiments, membership in a group is a means to an end—but not the end itself—the end being provisioning the appropriate computer resources to entities. For example, when a certain entity attempts to access a given computer resource, the tables quickly can be accessed to determine whether or not to grant access. The tables may have been calculated ahead of the request using the group information, but at the time of access the information is in place and recalculating the tables is unnecessary. Eliminating the need to recalculate the tables in response to an access attempt because the calculations have been performed ahead of time is one way in which the techniques of the present description offer increased efficiency and accuracy. Moreover, the tables may be kept current by updating them on a continual, periodic, or timed basis.

Figure 3:
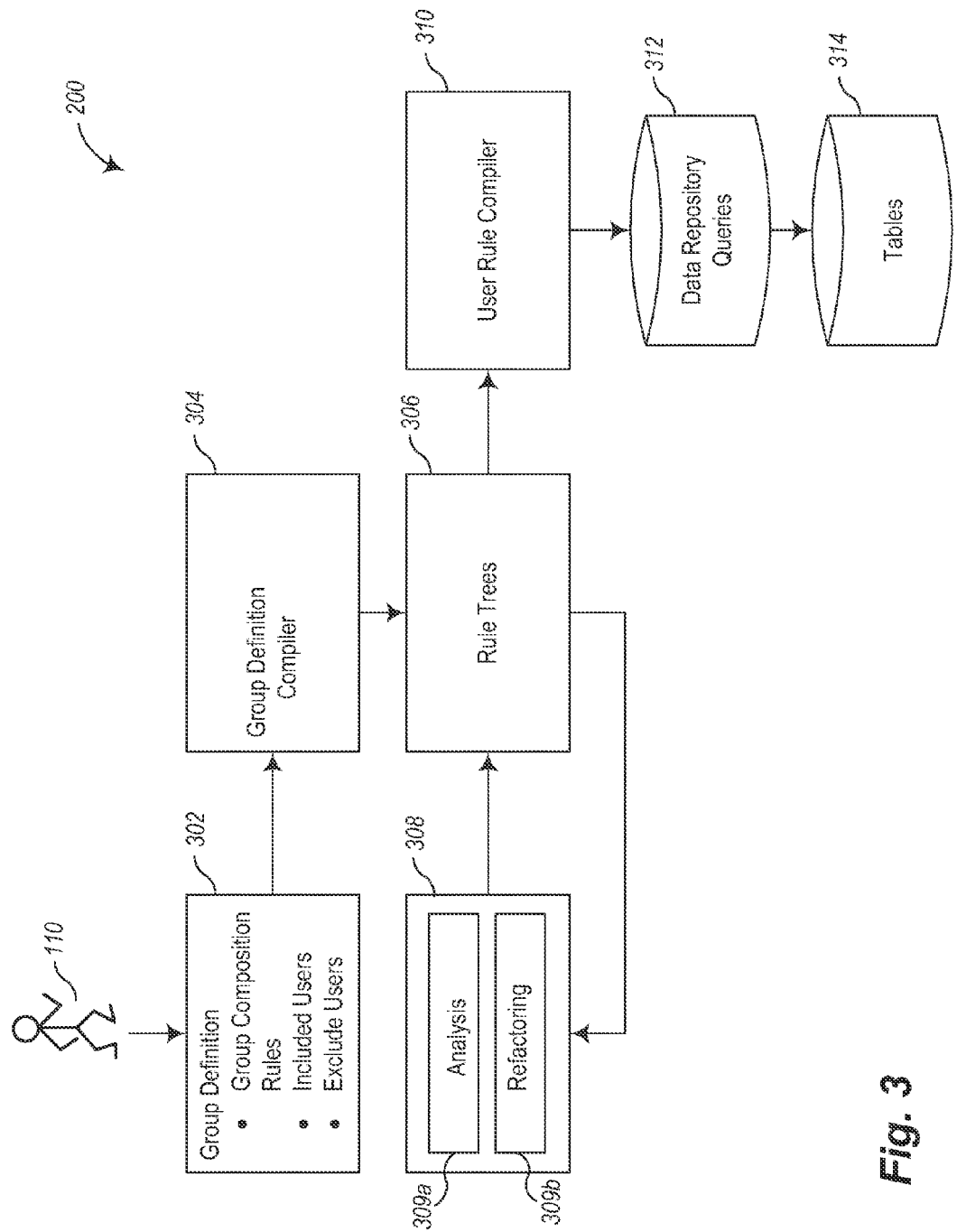
FIG. 3 is an example block diagram of components of an example Group Management Engine.

In one example embodiment, the GME 200 comprises one or more functional components/modules that work together to permit efficient management of groups of entities and to administer entitlements to and provisioning of computer resources. FIG. 3 is an example block diagram of components of an example Group Management Engine. The GME 200 receives input from a user 110 (e.g., an administrator or manager) as described above. The GME 200 receives and stores one or more group definitions 302 that include Group Composition Rules ("GCRs"), an included user list, and an excluded user list. The GCRs of the group definition 302 include logic clauses such as "include people over age 30" or "exclude people outside the Continental United States" or any other suitable rule as desired. The "included users" and "excluded users" components can be similar to rules, but they are specific to one or more users, and can be recast as entity-specific rules. The rules can be combinations of rules, such as disjunctive or conjunctive combinations. In some embodiments, the rules are complex logical expressions with features such as flow control statements found in programming languages.

The GME 200 passes (e.g., forwards, directs, etc.) each group definition to a Group Definition Compiler 304 which parses the rules into a rule tree 306, discussed in more detail with respect to FIGS. 4 and 5 below. The term "compiler" generally refers to any type of processor and is used in embodiments of this disclosure without loss of generality. The branches of each rule tree are individual rules from each group definition 302. The GME 200 also includes a user rule compiler 310 which receives the rule trees 306 and creates one or more data repository queries 312 corresponding to each group. In some embodiments, the data repository queries can be SQL queries or other suitable data queries. From the data repository queries 312, one or more tables 314 are generated, such as the UserGroup table 214 discussed above with reference to FIG. 2. These tables 314 are used to determine which entities are entitled to access which computer resources.

The GME 200 also includes an analysis and refactoring component 308 that can, from time to time, analyze the accuracy and efficiency of the GME 200 by refactoring the group definitions or the rule trees. In particular, the analysis portion of the analysis and refactoring component 308 seeks to determine whether a given group definition is redundant with another group definition, whether a group definition is inaccurate, or whether a group definition is trivial—returning all possible results, or zero results. The refactoring portion of the analysis and refactoring component 308 then alters the group definitions accordingly to remove the inefficiency or inaccuracy.

In some embodiments, the analysis and refactoring component 308 is implemented as a single component 308. In other embodiments the analysis and refactoring component 308 is implemented as two separate components: an analysis component 309*a* and refactoring component 309*b*. The analysis component (or portion) 309*a* can look at any number of rule trees 306 and compare the trees to determine if any refactoring is desirable. An example of an inefficiency in a rule tree occurs when a logic clause within a rule tree is repeated in several rule trees, or when a rule tree returns zero results, or when a single logic clause can be better written as two or more logic clauses. The refactoring component (or portion) 309*b* corrects the inefficiency either by replacing logic clauses in a rule tree or by writing a new logic clause as a new rule tree. The analysis component 309*a* can determine redundancies, inefficiencies, or inaccuracies in different manners, such as by empirically reviewing the tables produced by the rule trees, or theoretically by analysis of the rule trees directly. By reviewing the rule trees directly, the analysis component 309a can operate without requiring the user rule compiler 310 to execute the rule trees and create the data repository queries 312 or the table 216.

Figure 4:
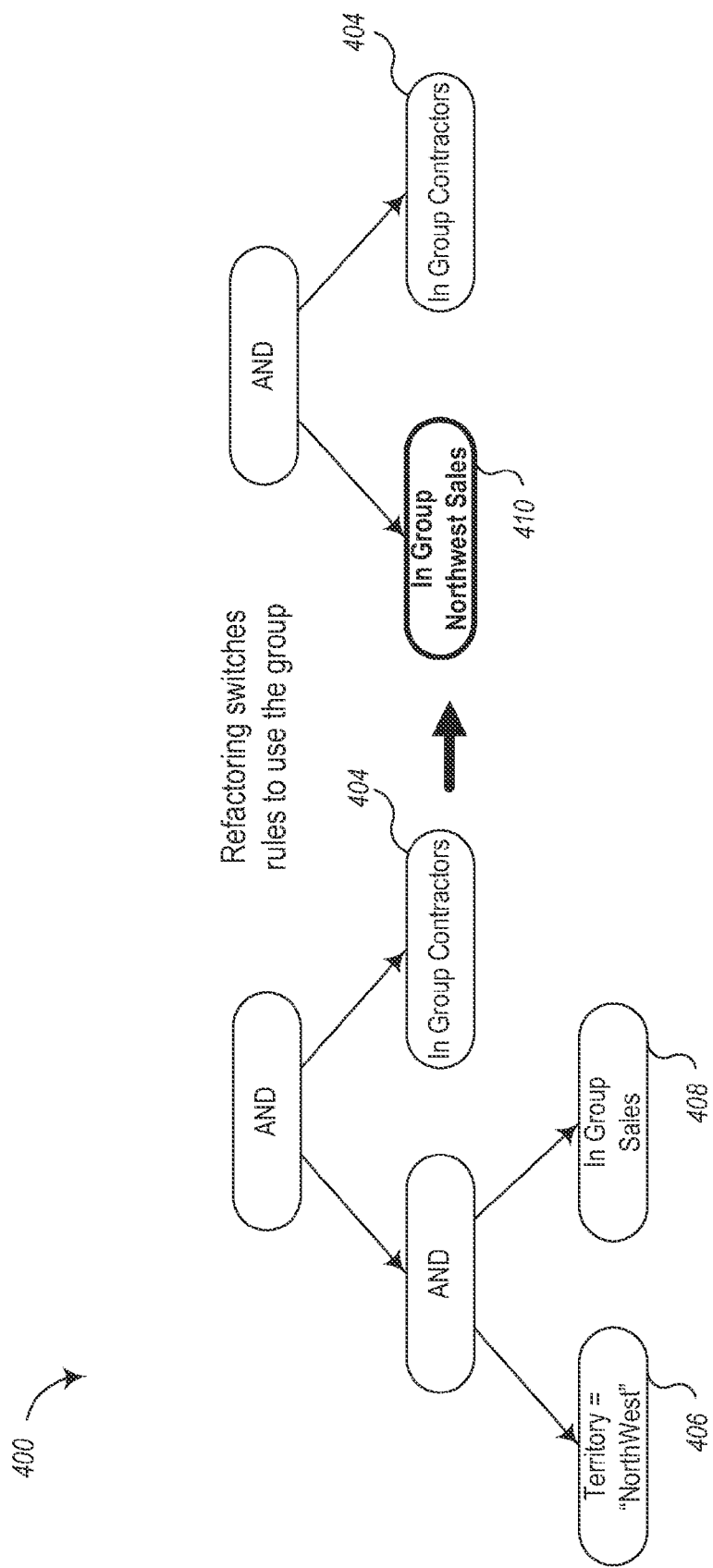
FIG. 4 illustrates example logic trees used for analysis and refactoring by the Group Management Engine.

FIG. 4 illustrates example logic trees used for analysis and refactoring by the Group Management Engine. The sequence illustrated in FIG. 4 shows a potential improvement contributed by the analysis and refactoring component 308 to an existing rule tree. In this example, a rule tree 400 includes three logic clauses conjunctively combined, or "ANDed" together: clause "Territory=Northwest" 406 is combined with "In Group Sales," which are both combined with "In Group Contractors" 404. The analysis component 309a detects that there is already another group containing the same logic clauses 406 and 408: "In Group Northwest Sales" 410 (the logic is not shown). Thus, the refactoring component 309b replaces the logic clauses 406 and 408 with a group 410 to achieve the same UserGroup table entries (e.g., group membership) but with less computation.

Figure 5:
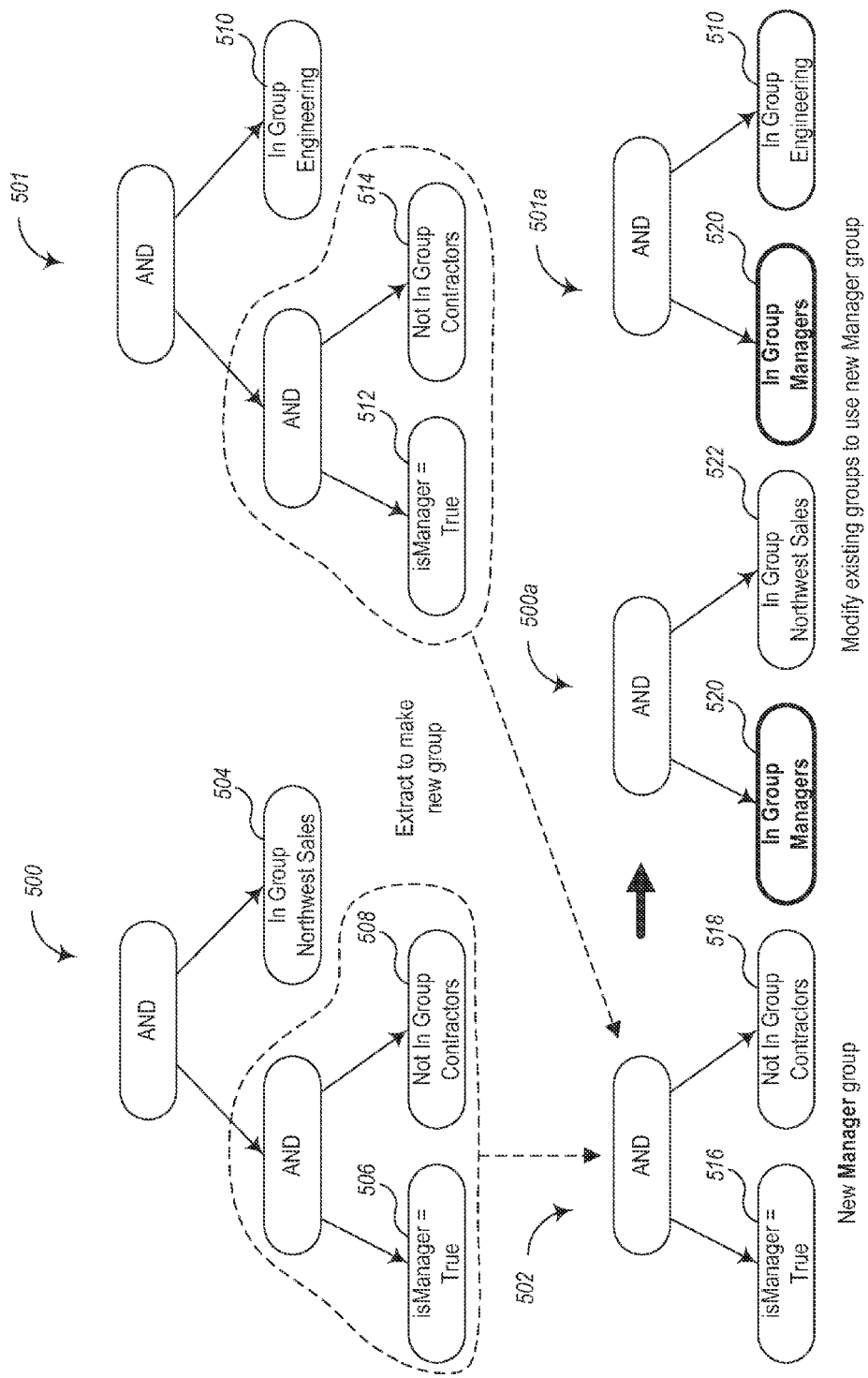
FIG. 5 illustrates further example logic trees for analysis and refactoring by the Group Management Engine.

FIG. 5 illustrates further example logic trees for analysis and refactoring by the Group Management Engine. The logic trees show another way in which the analysis and refactoring component 308 minimizes inefficiency. In this example, the analysis component 309a determines that one or more logic clauses is found in two or more rule trees. The duplicated logic clauses can be formed into a new, separate group. For example, rule tree 500 includes the logic clauses "Is Manager=True" 506 conjunctively combined with "Not In Group Contractors" 508. These are both conjunctively combined with "In Group Northwest Sales" 504. Another separate rule tree 501 also includes "Is manager=True" 512 conjunctively combined with "Not In Group Contractors" 514. These rules are further combined with "In Group Engineering" 510. The analysis component 309a detects that these logic clauses 506, 508, 512, and 514 appear in the same combination in different rule trees. Accordingly, the refactoring component 309b generates a new rule tree 502 defining a new group that includes managers and excludes contractors by including the logic clauses "Is Manager=True" 516 and "Not In Group Contractors" 518. The refactoring component 309b then modifies the rule trees 500 and 501 to point to the new group 502 by replacing the logic clauses 506 and 508 with the new clause "In Group Managers" 520 to the rule tree 500 to yield new rule tree 500a and similarly replacing the logic clauses 512 and 514 with the new clause "In Group Managers" 520 in rule tree 501 to yield new rule tree 501a.

There are many other ways in which the analysis component 309a and the refactoring component 309b can improve the efficiency of the calculations required to generate the tables described above with reference to FIG. 2. For example, the analysis component 309a can detect when a rule tree returns zero results, perhaps a sign of a contradictory logic clause or pair of logic clauses that are impossible to satisfy (e.g. "Include Managers" and "Exclude Managers"). Or perhaps the logic clauses are too broad and return a trivial response including all possible results. The analysis and refactoring component 308 can notify an administrator before making a change to avoid an unwanted result, or just to confirm the execution.

Figure 6:
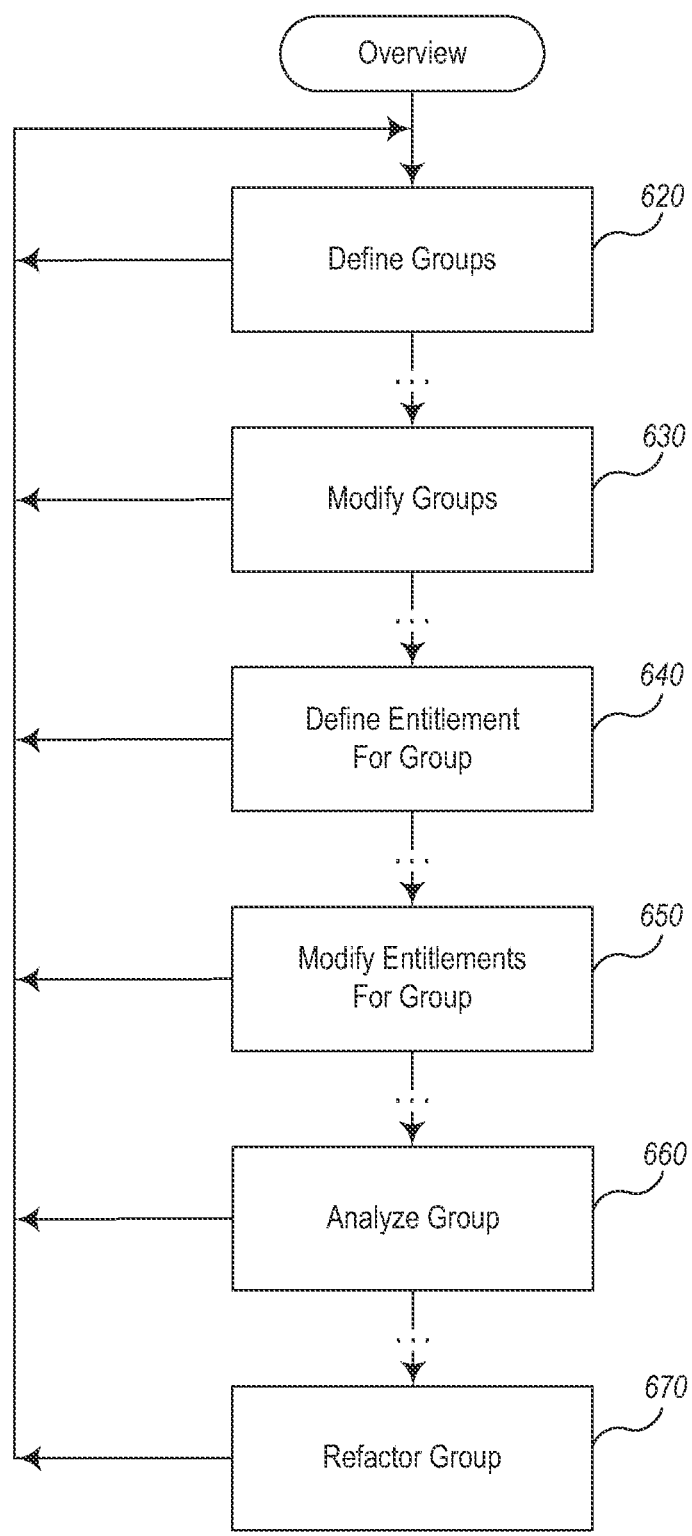
FIG. 6 is an overview of tasks that can be performed with an example embodiment of an Entitlement Management System.

FIG. 6 is an overview of tasks that can be performed using an example embodiment of an Entitlement Management System. The EMS 120 permits an administrator (or other user) to define groups 620 by describing criteria and logic clauses for the groups. This can be done on the basis of the entities' roles within an organization. Once these groups are defined, they can be modified 630 at any time and the changes will propagate through the EMS to generate the flat tables that map users to groups and vice versa. The administrator therefore can ask the system at any time which users belong to a given group, or to which groups a given member belongs. The administrator can also define entitlements for the group 640, and modify the entitlements for the group 650. Such changes will initiate a calculation of a new table similar to the process that happens when user or group information is changed. This calculation is considered idempotent in that, for any reason, if the calculation is to be performed when there has not been a change to the users, groups, or entitlements, the result remains appropriately unchanged. Furthermore, the administrator can instruct the EMS 120 to perform analysis and refactoring at any desired time, or in response to any desired input stimulus such as adding a new group or modifying group or user information. Any of these tasks can be performed in any order, or in response to any appropriate event or input.

Although the techniques of managing and entitling dynamic groups and the EMS are generally applicable to any type of organization, the phrase "computer resource" is used generally to imply any type of resource, and need not necessarily be limited to computer resources. The techniques, systems, and methods of the present disclosure can be used to grant access to anything, not just computer resources. Essentially, the concepts and techniques described are applicable to any organization such as a company, a government, an organization, or a family.

Also, although certain terms are used primarily herein, other terms could be used interchangeably to yield equivalent embodiments and examples. For example, it is well-known that equivalent terms could be substituted for such terms as "compiler," "database," "data repository," "network," etc. Specifically, the term "compiler" can be used interchangeably with "processor." In addition, terms may have alternate spellings which may or may not be explicitly mentioned, and all such variations of terms are intended to be included.

Example embodiments described herein provide applications, tools, data structures and other support to implement an Entitlement Management System to be used for dynamically managing and entitling groups. Other embodiments of the described techniques may be used for other purposes, including for dynamically managing groups of human and/or non-human entities such as computer systems. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 7:
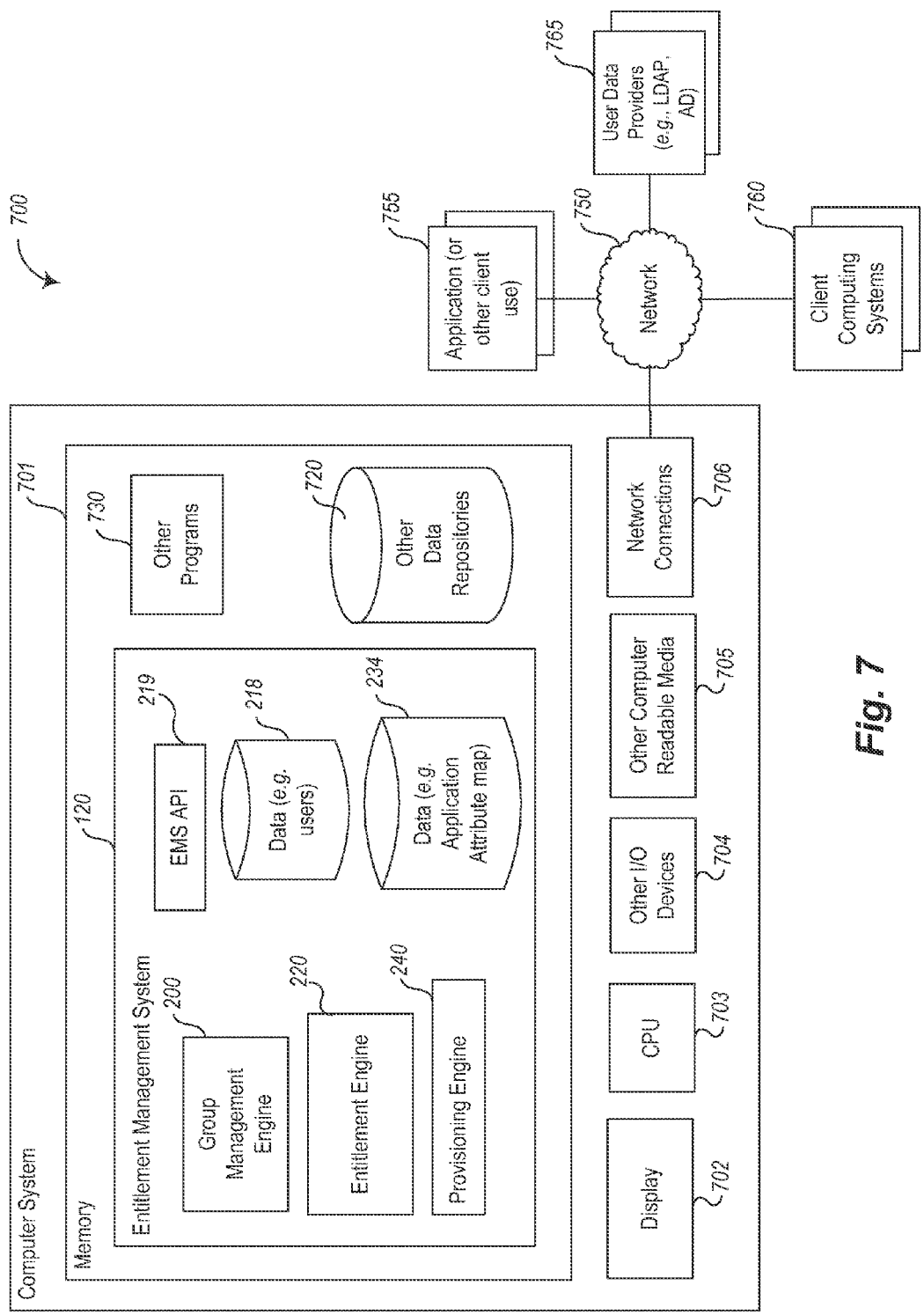
FIG. 7 is a an example block diagram of a computing system for practicing example embodiments of an Entitlement Management System.

FIG. 7 is a an example block diagram of a computing system for practicing example embodiments of an Entitlement Management System. The computing system includes a non-transitory memory storing an EMS 120 having a GME 200, an EE 220, and a PE 240. Note that a general purpose or a special purpose computing system suitably instructed may be used to implement an EMS 120. Further, the EMS 120 may be implemented in software, hardware, firmware, or in some combination to achieve the capabilities described herein.

The computing system 700 may comprise one or more server and/or client computing systems and may span distributed locations. In addition, each block shown may represent one or more such blocks as appropriate to a specific embodiment or may be combined with other blocks. Moreover, the various blocks of the EMS 120 may physically reside on one or more machines, which use standard (e.g., TCP/IP) or proprietary interprocess communication mechanisms to communicate with each other.

In the embodiment shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The EMS 120 is shown residing in memory 701. In other embodiments, some portion of the contents, some of, or all of the components of the EMS 120 may be stored on and/or transmitted over the other computer-readable media 705. The components of the EMS 120 preferably execute on one or more CPUs 703 and manage the GME 200, EE 220, and PE 240, as described herein. Other code or programs 730 and potentially other data repositories, such as data repository 706, also reside in the memory 701, and preferably execute on one or more CPUs 703. Of note, one or more of the components in FIG. 7 may not be present in any specific implementation. For example, some embodiments embedded in other software may not provide means for user input or display.

In a typical embodiment, the EMS 120 includes one or more GMEs 200, one or more EEs 220, one or more PEs 240, and one or more data repositories, for example, a data repository 218 with, for example, user data, and a data repository 234 with, for example, application data. In some embodiments, the EMS 120 includes an EMS application programming interface ("API") 219 to enable other programs to access EMS data. In at least some embodiments, the EE 220 or the PE 240 is provided external to the EMS 120 and is available, potentially, over one or more networks 750. Other and/or different modules may be implemented. In addition, the EMS 120 may interact via a network 750 with application or client code 755 that receives entitlement data or group membership data computed by the EMS 120, one or more client computing systems 760, and/or one or more third-party information provider systems 765. Also, of note, the user data repository 218 or data application attribute map 234 may be provided external to the EMS 120 as well, for example in a data repository accessible over one or more networks 750.

In an example embodiment, components/modules of the EMS 120 are implemented using standard programming techniques. However, the EMS 120 and the various components thereof can be implemented using dynamic programming techniques, object-oriented techniques, or even in a distributed computing model. For example, the EMS 120 may be implemented as a "native" executable running on the CPU 703, along with one or more static or dynamic libraries. In other embodiments, the EMS 120 may be implemented as instructions processed by a virtual machine. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported. Also, other functions could be implemented and/or performed by each component/module, and in different orders, and in different components/modules, yet still achieve the described functions.

In addition, programming interfaces to the data stored as part of the EMS 120 (e.g., in the data repositories 218 and 234) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 218, 234 may be implemented as one or more database systems, file systems, or any other technique for storing such information, or any combination of the above, including implementations using distributed computing techniques.

Also the example EMS 120 may be implemented in a distributed environment comprising multiple, even heterogeneous, computer systems and networks. Different configurations and locations of programs and data are contemplated for use with techniques of described herein. In addition, the portions of the EMS 120 may be executed on physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an EMS 120.

Furthermore, in some embodiments, some or all of the components of the EMS 120 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device)

to enable the computer-readable medium to execute or otherwise use or provide the contents to perform at least some of the described techniques. Some or all of the components and/or data structures may be stored on tangible, non-transitory storage mediums. Some or all of the system components and data structures may also be transmitted in a non-transitory manner via generated data signals (e.g., as part of a carrier wave or other analog or digital propagated signal) on a variety of computer-readable transmission mediums, such as media 705, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 8:
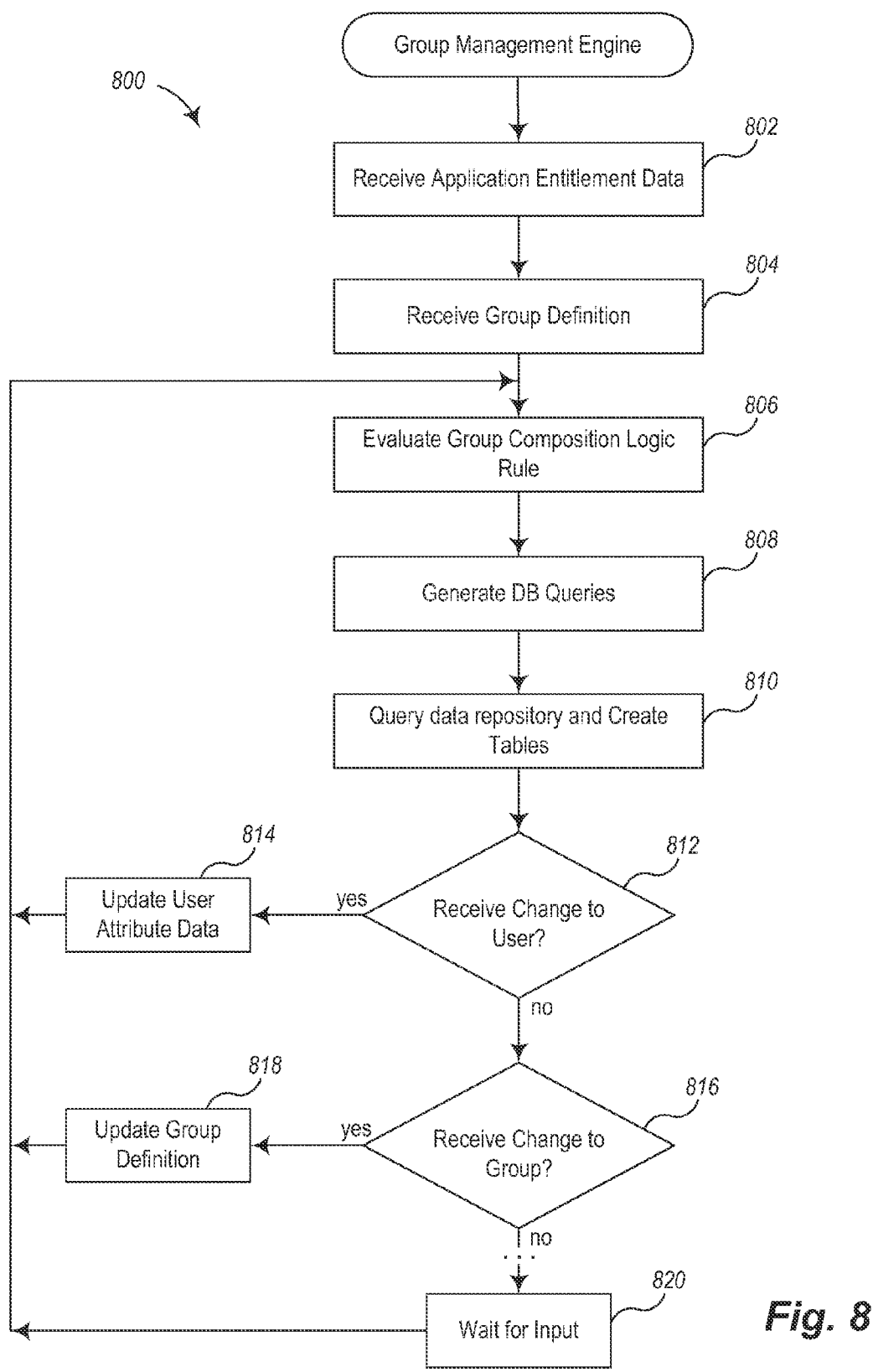
FIG. 8 is a flow diagram illustrating example logic performed by an example Group Management Engine.

As mentioned with respect to FIGS. 1-6, one of the functions of the Entitlement Management System is to manage group membership in order to generate user entitlement data. FIG. 8 is a flow diagram illustrating example logic performed by an example Group Management Engine. The logic of FIG. 8 may be performed, for example, by GME 200 illustrated in FIGS. 1 and 2. In block 802, the GME receives application entitlement data. The entitlement data may describe who is entitled to access which computer resource. This entitlement data may not be associated with a particular user, but rather may be expressed as characteristics such as what devices the application can be run, with how many users at a time, during what hours, etc. Entitlement data can also determine when, how, and for how long the entitled party can access the resource such as by subscription or license.

At block 804, the GME receives a group definition. The group definition may include one or more logic clauses that must be satisfied for a certain member candidate to be part of the group. The group definition may be any suitable combination of logic clauses and/or combinations thereof as described above. The group definitions can be correlated by roles of the entities relative to an organization, which may simply be defined by management when the computer resource in question relates to the entities' ability to perform their role. The group definition can, however, be any arbitrary criteria.

Blocks 806-820 define a loop that can repeat as often as required to process changes to user and/or group data. In block 806, the GME generates one or more queries based on the group composition logic rules. This portion of the logic can be executed by a group definition compiler 304 as described above with reference to FIG. 3.

At block 808, the logic clauses of the group definition are executed against the member candidates (candidate entities). That is, the attributes of each candidate are compared with the logic clauses of the group to determine which candidates satisfy the group composition rules or are on the included list, and are not on the excluded list. The result of this process is to generate database queries, such as SQL database queries, to generate the flat table data structures (or equivalents) that can be used to simply and efficiently access a list of members in each group.

In block 810, the database queries are performed and tables are generated. The tables can be flat tables that simply list the members in each group. These tables can then be used to look up members in the group without having to compute the group composition logic rule in response to an attempt to access a computer resource. Once the table is created, it can be used to identify which entities are members in a given group, or to identify which groups a given entity belongs to easily and quickly.

In block 812, the logic determines whether user data has changed, such as when a user retires or leaves the organization, or any other change that changes the user's status relative to one or more logic clauses that define membership in a group. When a change is made, in block 814 the logic updates the user attribute data and instructs the logic to initiate the loop again at block 806, including regenerating the tables. When no change has occurred, then at block 816, the logic determines whether there have been changes to group information that will affect one or more entity's membership in the group, such as changing a definition for a group of "senior" employees from "those having 3 years of experience" to "those having 4 years of experience. If yes, the logic continues at block 818, and, otherwise continues at block 820. At block 818, the logic updates the group definition and instructs the logic to initiate the loop again at block 806. In some embodiments, the loop can initiate in response to receiving a change to the user's status or the group's status.

At block 820, when no change to a user or a group has occurred, the logic waits for an additional input, such as a change to the user's status or the group's status.

The logic may respond to a request to update or recalculate the information in the tables with or without any changes to the user or group information. The logic can be structured such that these recalculations are idempotent so that calculating the tables again (or continuously) has little computational cost unless there are changes to the information. In some embodiments, recalculating the tables can happen in less than about one second in real time, minimizing the time during which information is out of synchronization. In response to a change of information, the logic can recalculate the entire table, or simply recalculate an affected portion of the table. In some embodiments, the logic can be instructed to recalculate the tables periodically. Depending on the organization in which the logic is deployed, the period for recalculating the tables may vary. For example, in a large scale environment receiving frequent requests for access and frequent user and/or group changes, the tables may need to be recalculated frequently.

Figure 9:
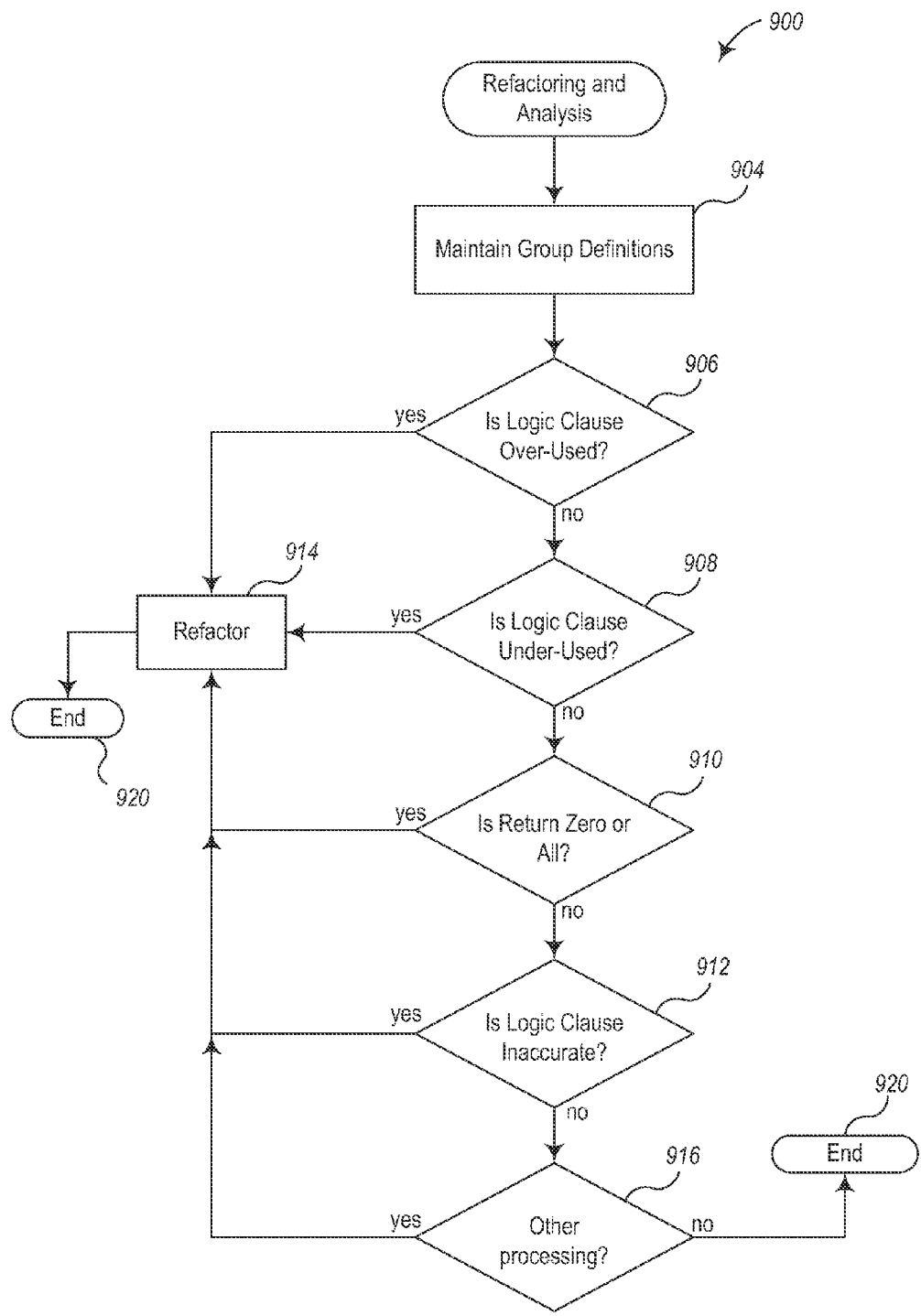
FIG. 9 is a flow diagram illustrating example logic performed by an example analysis and refactoring component of an Entitlement Management System.

Also as mentioned with respect to FIGS. 1-6, the EMS may include an analysis and refactoring component for creating further efficiencies. FIG. 9 is a flow diagram illustrating example logic performed by an example analysis and refactoring component of an Entitlement Management System. The logic can analyze and refactor group definitions to minimize inefficiencies, conflicts, or inaccuracies as described with reference to FIGS. 4 and 5. The logic of FIG. 9 can be performed, for example, by the analysis and refactoring component 308 in FIG. 3 in response to determining a need for improving the group definitions, or to perform periodic maintenance checks.

At block 904, the logic examines group definitions containing GCRs, include lists and exclude lists. The GCRs can include rules based on membership in one or more other groups.

At block 906, the logic determines whether or not a given logic clause is over-used. This can be the case if the logic clause appears in more than one group definition, or if the logic clause is redundant with one or more other logic clauses in the same group definition. If yes, the logic refactors the group definition at block 914. If no, the logic continues at block 908.

At block 908 the logic determines whether or not a given logic clause is under-used, such as if the logic clause is not called for a given period of time and the group can be formed using other logic clauses. If yes, the logic refactors the group at block 914. If no, the logic continues at block 910.

At block 910 the logic determines whether or not a given logic clause returns zero results or all possible results. In many cases a logic clause that returns all or zero possible entities is a sign of a logical conflict or a mistake. If yes, the logic refactors the group definition at block 914. If no, the logic continues at block 912.

At block 912 the logic determines the accuracy of a given logic clause. An example inaccuracy can be if the logic clause, for any reason, yields unforeseen results. A complex rule scheme, including multiple group-dependencies and cross-reference membership rules, may cause an unintended membership or omission. For example, the order of execution of group definitions may affect membership if membership in certain groups is a criteria for membership in another group. If yes, the logic refactors the group definition at block 914. Part of the analysis and refactoring process can be to run the group definitions in various orders and comparing the results. If no inaccuracy is found, the logic continues at block 916.

At block 916 the logic performs any other suitable check on the group definitions as desired by a given organization or implementation. If any problems are found, the logic can refactor at block 914. If no further problems are found, the logic proceeds to block 920.

After the logic refactors the group definition at block 914, the logic terminates at block 920.

The logic or any portion thereof can be executed in any order. The logic can initiate in response to virtually any measurable event or according to an arbitrary or determined schedule.

Figure 10A:
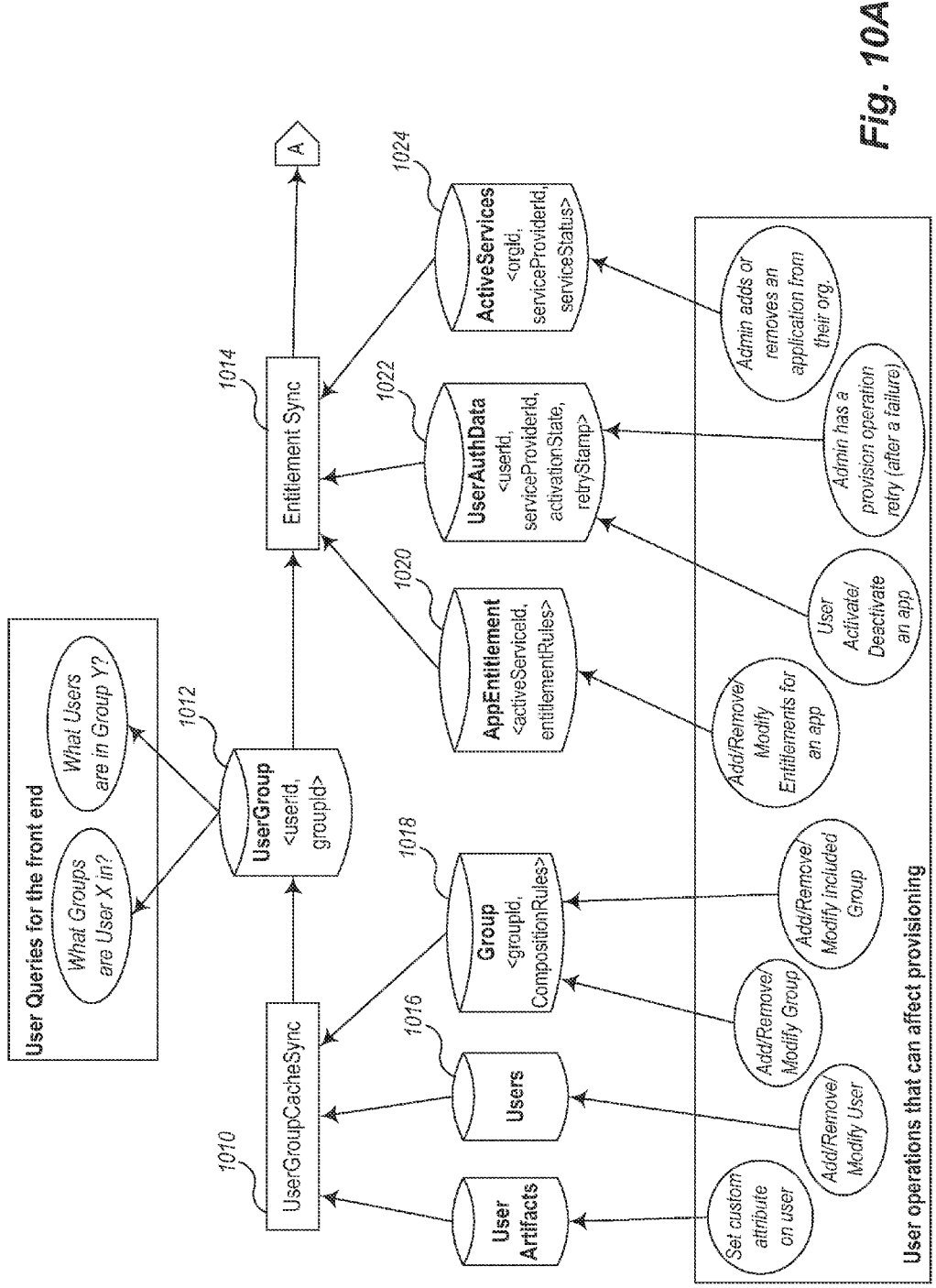
FIGS. 10A and 10B illustrate an example data flow of an example Entitlement Management System.
Figure 10B:
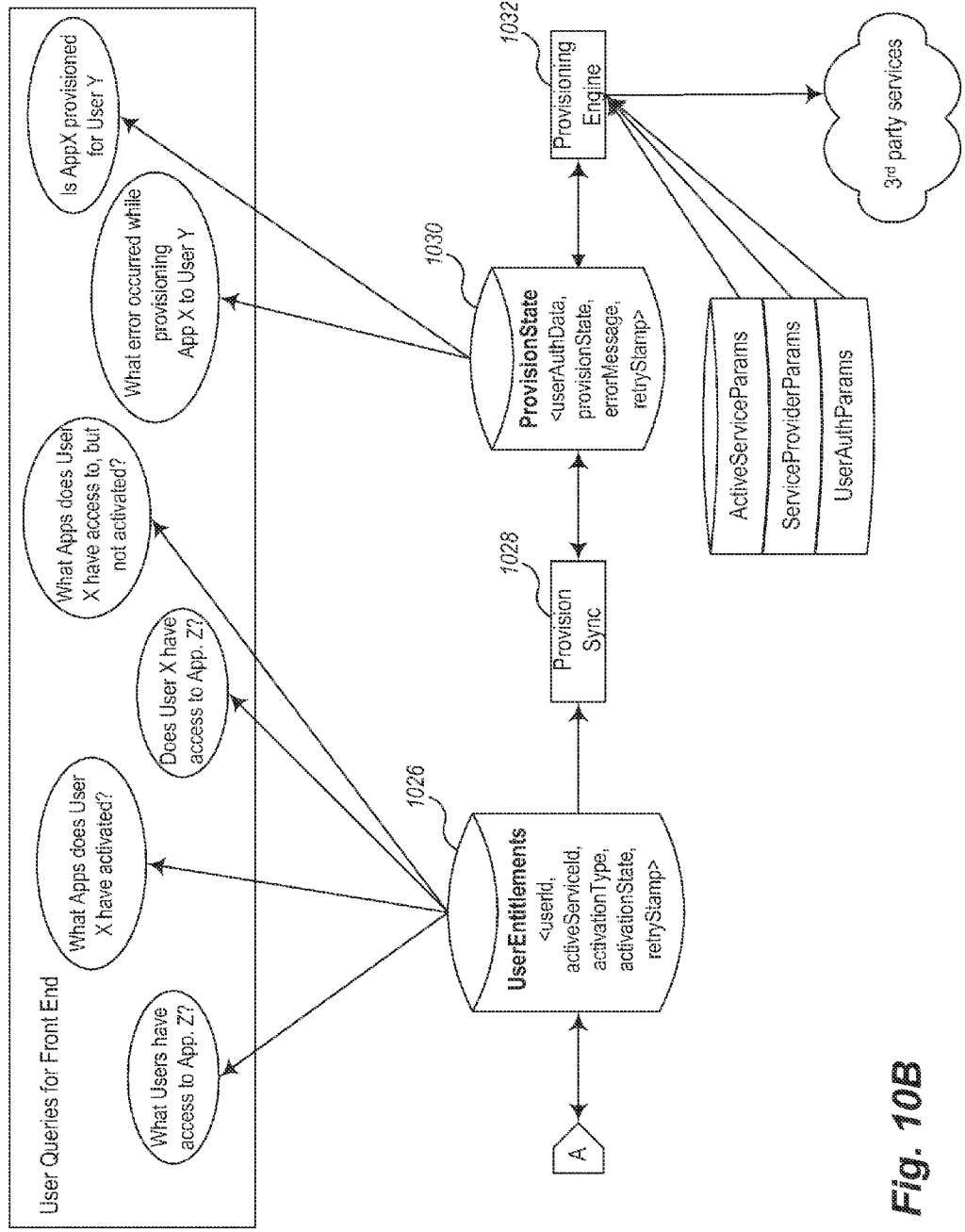

FIGS. 10A and 10B illustrate an example data flow of an example Entitlement Management System. In an example embodiment, the data for the various components of the EMS 120 can be stored as described in Table 1:

TABLE 1

| Data | Storage | Relevant Information |
| --- | --- | --- |
| Groups (1018) | Database table | Defines a group in an organization. Contains the name and the set of rules used for determining group membership. <GroupId, OrgId, GroupName, GroupCompositionRules> GroupId—Unique ID of the group OrgId—Unique ID of the organization the group is in GroupName—Name of the group GroupCompositionRules—A text field containing the rules for users and groups contained in this group. |
| Users (1016) | Database table | Defines a user in the system. <UserId, OrgId, UserName> The Users table contains a lot more columns than listed here. These columns are the ones relevant to the entitlement subscription process. UserId—Unique Id of the user OrgId—Unique Id of the org UserName—Name of the user |
| AppEntitlement (1020) | Database table | Defines a mapping between an app (activeService) and a set of rules determining which users or groups have access to that app. <EntitlementId, ActiveServiceId, EntitlementRules> EntitlementId—Unique ID for this app entitlement ActiveServiceId—Id of the Active |

TABLE 1-continued

| Data | Storage | Relevant Information |
| --- | --- | --- |
| | | Service that this entitlement refers to. EntitlementRules—A text file containing the rules for which users or groups have access to this app. |
| UserAuthData (1022) | Database table | Defines the user's subscription to an app, and it's activation state. <ServiceId, ActiveServiceId, UserId, ActivationState, RetryStamp> ServiceId—Unique ID for this record ActiveServiceId—ID of the active service this record relates to. UserId—ID of the user that has a subscription to the specified app (ActiveService) ActivationState—Enum describing whether this is: Activated or Deactivated. RetryStamp—Last time this subscription had a provisioning event started. Could be set from an app getting activated or a failed provision being retried. |
| ActiveServices (1024) | Database table | Maps applications to an organization. <ActiveServiceId, ServiceProviderId> ActiveServiceId—Unique ID for this Active Service ServiceProviderId—ID for the canonical app definition |

In an example embodiment of the EMS 120, the persistent calculated data might be stored as described in Table 2:

TABLE 2

| Data | Storage | Relevant Information |
| --- | --- | --- |
| UserGroup (1012) | Database Table | Maps from GroupId to UserId, and back. This provides a single table generated from the Group Composition Rules. Provides a single place to find changes in group membership whether based on user attributes changing or group rules changing. <UserId, GroupId> UserId—Unique ID for a user GroupId—Unique ID for a group |
| UserEntitlements (1026) | Database Table | Maps directly from UserId and ActiveServiceId. Provides a single table showing all applications enabled to a user. <UserId, ActiveServiceId> UserId—Unique ID for a user ActiveServiceId—Unique ID for the enabled Active Service |
| ProvisionState (1030) | Database Table | Keeps track of the provisioning state for an application. <UserEntitlementId, ProvisioningState, ErrorMessage, RetryStamp> UserEntitlementId—ID for the UserEntitlement record that initiated this provision operation. ProvisioningState—State of the provisioning operation. ErrorMessage—Filled out if provision failed, and an error was reported. RetryStamp—Stamp for the time that initiated this provision operation. |

The data can flow through the entitlement and provisioning system through a series of synchronization (sync) processes. Sync processes are single threaded operations that look up changes in their source tables and update a destination table. There are three sync processes:

TABLE 3

| | |
|---|---|
| UserGroupSync (1010) | Updates the UserGroup 1012 table from changes in the Group and User tables. |
| EntitlementSync (1014) | Updates the UserEntitlements 1026 table from changes in the UserGroup 1012, AppEntitlement, UserAuthData 1022 and ActiveServices 1024 tables. The table generated by this process also includes: the activation type for the entitlement (user-activated or automatic); the activation state (whether the user activated the app); and a "retry" stamp that comes from UserAuthData 1022 and is used in the case of a failed provision. If an admin hits a retry, it will cause the UserAuthData 1022 table to update this field, which will be caught by the entitlement engine to update. |
| ProvisionSync (1028) | Updates the ProvisioningState table based on the UserEntitlements 1026 table. Takes UserEntitlements 1026 and ProvisioningState and generates changes to ProvisioningState. ProvisioningState will be modified by two processes. This concurrency will be managed by: 1. Using optimistic concurrency to make sure all writes are purely based on what was read. 2. The State Machine for the provisioning State will only allow one process (ProvisionSync 1028 or ProvisionEngine 1032) to move the record out of any one state. |

In an example EMS, each sync process operates in roughly the same way: (1) it runs on a timer (e.g., in a java process) possibly on multiple machines; and (2) it wakes up and participates in a leader-election to find which instance (to determine which sync process should actually perform the sync). The "leader" will then look for any changes in the source tables, and feed them into core CacheServicer which is responsible for generating changes to the target table. The last update time is stored as a Global Configuration Parameter and is only updated when a sync operation has completed successfully.

The UserGroup Sync process (1010) looks at two input tables: Users and Groups. In an example embodiment, the UserGroup Sync is the only process that writes to the UserGroup 1012 table. Also, in an example embodiment, writing to the UserGroup 1012 table is the only side-effect of the UserGroup Sync process (1010). Table 4, below, illustrates actions that occur when specific events affect the user and/or group input tables.

TABLE 4

| Event | Action |
|---|---|
| UserArtifact is modified | The ArtifactDataService will "touch" the User record associated with the artifact so it is picked up in the next sync. |
| User is modified | The UserGroup Sync will re-calculate what groups the user should be in, and add/remove the user from the groups appropriately. It will then compare this list of groups, to all the groups mappings in the UserGroup 1012 table and will add/remove records from the UserGroup 1012 table to make them equivalent. |
| User is deleted | The UserGroup Sync will remove all records mapping groups to the deleted user. |

TABLE 4-continued

| Event | Action |
|---|---|
| Group is modified | The UserGroup 1012sSync will reload the group and re-calculate the list of users in the group. It will then update the UserGroup 1012 table |
| Group is deleted | The UserGroup Sync will delete all entries in the UserGroup 1012 table related to the group being deleted. |

The Entitlement Sync process 1014 looks at four input tables (in the specified order): (1) UserGroup 1012; (2) AppEntitlement 1020; (3) ActiveServices 1024; and (4) UserAuthData 1022. In an example embodiment, the EntitlementSync process 1014 is the only process that writes to the UserEntitlement 1026 table. Also, in an example embodiment, Writing to the UserEntitlement 1026 table is the only side-effect of the EntitlementSync process 1014.

In some embodiments the UserAuthData 1022 is the last table to be reviewed so that if an activation and an entitlement occur in the same sync period they will be processed in the right order. In another embodiment the Entitlement Sync process 1014 is implemented in two parts: an Entitlement Sync process 1014 and Activation Sync process. Table 5, below, illustrates actions that occur when specific events affect the input tables (1012, 1020, 1024, and 1022) to the EntitlementsSync process 1014.

TABLE 5

| Event | Action |
|---|---|
| UserGroup entry is added | Calculate expected entitlements for the user who was added to the new group. |
| UserGroup entry was deleted | Calculate expected entitlements for the user who was added to the new group. |
| AppEntitlement entry is added | Calculation expected entitlements for the Application that was added. |
| AppEntitlement entry is deleted | Calculation expected entitlements for the Application that was added. |
| UserAuthData entry is added | Calculate expected entitlements for the user who was added to the new group. |
| UserAuthData entry is deleted | Calculate expected entitlements for the user who was added to the new group. |

The design of the system is meant to be resilient to failures. Modification of tables relating to users can be simple operations that occur in database transactions. Updating calculated data tables is an idempotent operation that occurs periodically. This means that any failures that bring these out of sync, e.g. code errors, massive usage spikes, database crash/corruption, can be corrected by running the sync processes over again.

The following relationships as illustrated in Table 6 are a part of the system's security, in an example embodiment.

TABLE 6

| | |
|---|---|
| Data Center Operator | A person responsible for deploying and managing the hardware needed to deploy the system on. These people are also responsible for setting up and physically securing the data center. This team may provide higher level services such as SQL support or Memcached support. |
| Encryption Server | Refers to a server that will replace the ID Vault. This server is responsible for: Managing Customer Encryption Keys Encrypting and Decrypting customer data These servers contain all the sensitive operations for the system. |

TABLE 6-continued

| | |
|---|---|
| | Physical access requires both a System Security Officer AND a Data Center Operator. Only server not running as a virtual machine. |
| System Admin | A person responsible for deploying and managing the System Servers. This person is also responsible for deploying, managing and backing up supporting servers needed by the system but not provided by the Data Center Operations team. E.g. MySQL, Memcached, etc. |
| System Security Officer | A person responsible for securing the Master Keys and deploying/managing the Encryption Service. |
| System Server | Refers to any of the Tomcat-based servers deployed for running the system, except the Encryption Service. These servers are responsible for all system functionality, except those explicitly owned by the Encryption Service. In an example embodiment, this is a single server. In an alternative example embodiment, there may be different servers for running the front-end and back-end. |
| ID Vault | Refers to the existing server/appliance that stores keys for the system. This will be replaced by the Encryption Service. |
| Master Encryption Keys | These are special encryption keys with the system Wide scope. They are used by the Encryption Service to encrypt user keys before storing them in its database. These keys should only be accessible by the System Security Officer. These keys should not be accessible by anyone else. |
| Offline Attack | An attack where the attacker is able to get access to some persistent state, e.g. a database backup, and use that to learn secrets. |
| Online Attack | An attack where the attacker is able to hijack one of the servers, E.g. if an attacker can attach a debugger to a running process, they can get all the data seen by that process. |

The description below describes some of the different states of an entitlement and the user-based operations that may occur to cause transitions across the states. These states can be managed through three different fields:

(1) ActiveServices status describes whether an application is active for an organization or not. This comes from the Active Service 1024 (idServiceStatus).

(2) EntitlementState describes whether an application is entitled to a user or not. This information is calculated from the UserGroup 1012, Users 1016 and AppEntitlement 1020 tables.

(3) ActivationState describes whether a user should actually have a subscription to an application or not. This information comes from the UserAuthData 1022 table.

These states can be changed through both administrator and user operations. The following tables (1) describe each of these states and what they mean; (2) describe the Admin+User operations that change these states; (3) describe the processes used to manage these changes in the context of the system architecture; and (4) describe extensions to the state model for integration with workflows (without describing any of the processes for these state changes).

The app and entitlement state transitions are designed to decompose the global state into three well-defined states that match directly to user operations:

(1) ActivationServiceStatus is managed by administrators. This status is controlled by the add/remove application operations.

(2) EntitlementState is managed by administrators. It is controlled with modifications to Application Entitlements.

(3) ActivationState is managed by users. It is controlled by activating or de-activating applications the users are entitled to.

These states are extendable to add states for integrating with workflows.

For an example embodiment, the state overview is as shown in Table 7:

TABLE 7

| State | Operators | Description |
|---|---|---|
| ActiveServices 1024tatus | Administrators | Defines the activation state of an organization's service. This is a member of an ActiveService |
| EntitlementState | Administrators | Defines the level of Entitlement a User or Group is granted. This is a member of an AppEntitlement. |
| ActivationState | User | Defines the expectation for whether this user should have a subscription to this application. This is a member of UserAuthData 1022. |

ActiveServices status describes whether an application is activated for an organization or not. In an example embodiment, only a request thread, not a sync thread, should set this state. An organization with no ActiveService for an application should be semantically the same as an organization with a Deactivated ActiveService for an application.

Operations on ActiveServices status is shown in Table 8:

TABLE 8

| Operation | Role | Description |
|---|---|---|
| Deactivate Active Service | Administrator | Request thread sets the state on the Active Service as "deactive" The request thread should remove the AppEntitlements 1020 for this application. This is the action that will signal to the UserEntitlements sync 1014 thread to re-evaluate entitlements for this application. The request thread should not update the UserAuthData 1022 structures. These will be kept in sync by the UserEntitlements sync 1014 thread. |
| Activate Active Service | Administrator | Request thread sets the state on the Active Service as "active" The request thread should add an AppEntitlements 1020 for this application. This is the action that will signal to the |

TABLE 8-continued

| Operation | Role | Description |
|---|---|---|
| | | UserEntitlements sync 1014 thread to re-evaluate entitlements for this application. The request thread should not update the UserAuthData 1022 structures. These will be kept in sync by the UserEntitlements sync 1014 thread. |

States for ActiveServices status are shown in Table 9:

TABLE 9

| State | Description |
|---|---|
| Active | The ActiveService is activated and can be subscribed to by users with entitlements. |
| Deactive | The ActiveService is not activated for this organization. No users can have a subscription to it, and any existing subscriptions should be deleted. |

EntitlementState is the entitlement state for a user based on the AppEntitlements 1020, UserGroup 1012, and Users 1016 tables. ActivationPolicy in the Entitlement structure in AppEntitlement will determine if an entitlement is "User" or "Auto." If it is "user," the user indicates when to launch an application the user is entitled to, for example, by double-clicking on an icon with an input device. If it is "Auto," the system may launch the application upon user login. Having an entitlement state of "None" is represented in our system by having no UserEntitlement record. There is no explicit "None" state for ActivationPolicy. In an example embodiment, only a request thread, not a sync thread, should make changes to the AppEntitlement 1020 table.

Operations on Entitlement State are shown in Table 10:

TABLE 10

| Operation | Role | Description |
|---|---|---|
| Giving a User/Group a User-activated entitlement | Administrator | Administrator explicitly modifies the AppEntitlement to add an entitlement for a user or group. The Request Process will modify the AppEntitlement table 1020. The UserEntitlements sync 1014 will update the UserEntitlement table 1026 with any changes, and will execute any state changes as a result. |
| Giving a User/Group an Auto-activated entitlement | Administrator | Administrator explicitly modifies the AppEntitlement 1020 table to add an entitlement for a user or group. The Request Process will modify the AppEntitlement 1020 table. The UserEntitlements sync 1014 will update the UserEntitlement 1026 table with any changes, and will execute any state changes as a result. |
| Removing an entitlement from a User or Group | Administrator | Administrator explicitly modifies the AppEntitlement 1020 table to add an entitlement for a user or group. The Request Process will modify the AppEntitlement 1020 table. The UserEntitlements sync 1014 will update the UserEntitlement 1020 table with any changes, and will execute any state changes as a result. |
| User changes group membership | Administrator, AD Sync | This can happen in many ways: 1) User Attributes change, so they are either included or not included in a group 2) Group changes, so users are either excluded or included. 3) New User added or Existing user removed |

States for Entitlement State are shown in Table 11:

TABLE 11

| State | Description |
|---|---|
| None | The given user does not have an entitlement for this application. They should not be able see it in their user portal or app catalog. This state is not stored as part of a flag. No entitlement existing or no UserEntitlement row denotes this state. |
| User | The user is given an entitlement to an application, so they can see the application in their user portal or app catalog. However, in order to use the application, they will need to first manually activate it. |
| Auto | The user is given an entitlement to an application, so they can see the application in their user portal. The application will automatically be activated for the user. |

Activation State describes whether an entitlement is "activated" or not. This acts as "expected state" for the provisioning operations and subscription information. When ActivationState is activated, the application should have subscription parameters provided with it. It may at any time be provisioned based on whether the proper parameters are filled out. When ActivationState is notActivated, the application may have subscription parameters associated with it, if it was activated earlier. The application should be either de-provisioned or in the process of de-provisioning. When ActivationState is deleted, the application should not have subscriptions parameters associated with it. If it was previously activated its parameters should be cleared.

Operations on Activation State are shown in Table 12.

These are operations that directly affect activation state. There are several operations already listed above that will cause activation states to change as a result, e.g. disabling an application for an organization.

TABLE 12

| Operation | Role | Description |
|---|---|---|
| Activate an app the user has an entitlement to | User | User activates an App in the UI, which causes a direct change to the Activation State, to Activated<br>If the organization has workflow enabled, the activation state will get set to AwaitingActivation. |
| Deactivate an app the user has an entitlement to | User | User de-activates an App in the UI, which causes a direct change to the Activation State to Unactivated<br>If the organization has workflow enabled, the activation state will get set to AwaitingActivation. |
| Approving a user operation | Administrator | Administrator (or external workflow) respond to an activation or de-activation event affirmatively. |
| Denying a user operation | Administrator | Administrator (or external workflow) respond to an activation or de-activation event negatively. |

States for Activation State are shown in Table 13:

TABLE 13

| State | Description |
|---|---|
| Deleted | The app is not enabled in this organization, so all subscriptions, etc. should be deleted. |
| UnActivated | The user does not have an active subscription.<br>If the application is one the system provisioned, it should either be de-provisioned or in the process. |
| Activated | The user has an active subscription. This does not mean all the parameters have been filled out yet.<br>If the application is one the system can provision, the system should have either already provisioned the app or be in the middle of provisioning the app. |
| AwaitingActivation | An event (either getting an automatic entitlement, or a user entitlement the user activated) attempted to activate an application an admin needs to approve.<br>The applications should not have any parameters visible to the user yet.<br>If this is an application the system can provision, the system should not have started the provision operation yet. |
| AwaitingDeactivation | An event (either losing an entitlement, or a user deactivated their entitlement) attempted to de-activate an application an admin needs to approve.<br>The applications should still have parameters visible to the user.<br>If this is an application that the system can provision, the system should not have started the de-provision operation yet. |

All of the above U.S. patents, U.S. patent application publications, U.S. patent applications, foreign patents, foreign patent applications and non-patent publications referred to in this specification and/or listed in the Application Data Sheet, including but not limited to provisional patent application No. 61/481,184 filed on Apr. 30, 2011, are incorporated herein by reference, in their entireties.

From the foregoing it will be appreciated that, although specific embodiments have been described herein for purposes of illustration, various modifications may be made without deviating from the spirit and scope of the invention. For example, the methods and systems for performing dynamic group management discussed herein are applicable to other architectures other than a computer resource architecture. For example, the entitlements can pertain to other resources, such as physical plants or organizational privileges. Also, the methods and systems discussed herein are applicable to differing group management protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method comprising:
   maintaining a plurality of group definitions defining a plurality of groups, wherein the group definitions individually include one or more logic clauses that define membership in a corresponding group, wherein the one or more logic clauses, when evaluated, generate one or more data repository queries corresponding to the group which when executed indicate whether an entity is a member of one or more of the groups, and wherein the groups are either entitled to access the computer resource or not entitled to access the computer resource;
   analyzing, using a group management engine of a computer system, one or more of the group definitions to determine inefficiently used logic clauses of the one or more logic clauses, wherein analyzing each of the one or more of the group definitions includes parsing the group definitions into a rule tree using a group definition compiler and analyzing one or more tables produced by the rule tree for each of the following conditions:
   whether a given logic clause of the group definition is over-used, whether a given logic clause of the group definition is under-used, wherein a particular logic clause is under-used if the particular logic clause is not called for a given period of time and the group associated with the particular logic clause can be formed using one or more other logic clauses, and whether a given logic clause of the group definition is inaccurate;

in response to determining that one or more logic clauses satisfies a condition of being under-used, over-used, or inaccurate logic clauses, re-factoring the one or more group definitions by eliminating the inefficiently used logic clauses, wherein refactoring eliminates the inefficiency by replacing one or more logic clauses in a rule tree or by writing one or more new logic clauses as a new rule tree; and using the refactored group definitions to assign entitlements to each of the plurality of groups such that members of each group that receives particular entitlements are provided with access to computer resources provisioned based on the assigned entitlements.

2. The method of claim 1, wherein the computer resource comprises a software resource or a hardware resource.

3. The method of claim 1, wherein analyzing the one or more of the group definitions to determine over-used logic clauses comprises identifying where a first logic clause is equivalent to two or more second logic clauses, and wherein re-factoring the one or more group definitions comprises replacing the two or more second logic clauses with the first logic clause.

4. The method of claim 3, wherein the two or more second logic clauses appear in more than one group definition.

5. The method of claim 1, wherein re-factoring the one or more group definitions by eliminating the inefficiently used logic clauses comprises:

forming a new group definition containing two or more logic clauses;

removing the two or more logic clauses from the one or more group definitions; and adding to the one or more group definitions a reference to the new group definition.

6. The method of claim 1, wherein analyzing the one or more group definitions comprises identifying logic clauses that return either zero or all possible results, and wherein re-factoring the one or more group definitions comprises eliminating the identified logic clauses.

7. The method of claim 1, further comprising receiving an instruction to modify an attribute of a group definition or an entity; and re-factoring the group definitions to reflect the modified attribute or entity.

8. The method of claim 1, further comprising receiving and responding to a query for one or more of:

a list of entities that belong to a specific group; or a list of groups to which a specific entity belongs.

9. The method of claim 1, wherein the logic clauses relate to business roles within an organization.

10. A system comprising:

one or more computers configured to perform operations comprising:

maintaining a plurality of group definitions defining a plurality of groups, wherein the group definitions individually include one or more logic clauses that define membership in a corresponding group, wherein the one or more logic clauses, when evaluated, generate one or more data repository queries corresponding to the group which when executed indicate whether an entity is a member of one or more of the groups, and wherein the groups are either entitled to access the computer resource or not entitled to access the computer resource;

analyzing, using a group management engine, one or more of the group definitions to determine inefficiently used logic clauses of the one or more logic clauses, wherein analyzing each of the one or more of the group definitions includes parsing the group definitions into a rule tree using a group definition compiler and analyzing one or more tables produced by the rule tree for each of the following conditions:

whether a given logic clause of the group definition is over-used, whether a given logic clause of the group definition is under-used, wherein a particular logic clause is under-used if the particular logic clause is not called for a given period of time and the group associated with the particular logic clause can be formed using one or more other logic clauses, and whether a given logic clause of the group definition is inaccurate;

in response to determining that one or more logic clauses satisfies a condition of being under-used, over-used, or inaccurate logic clauses, re-factoring the one or more group definitions by eliminating the inefficiently used logic clauses, wherein refactoring eliminates the inefficiency by replacing one or more logic clauses in a rule tree or by writing one or more new logic clauses as a new rule tree; and using the refactored group definitions to assign entitlements to each of the plurality of groups such that members of each group that receives particular entitlements are provided with access to computer resources provisioned based on the assigned entitlements.

11. The system of claim 10, wherein the computer resource comprises a software resource or a hardware resource.

12. The system of claim 10, wherein analyzing the one or more of the group definitions to determine over-used logic clauses comprises identifying where a first logic clause is equivalent to two or more second logic clauses, and wherein re-factoring the one or more group definitions comprises replacing the two or more second logic clauses with the first logic clause.

13. The system of claim 12, wherein the two or more second logic clauses appear in more than one group definition.

14. The system of claim 10, wherein re-factoring the one or more group definitions by eliminating the inefficiently used logic clauses comprises:

forming a new group definition containing two or more logic clauses;

removing the two or more logic clauses from the one or more group definitions; and adding to the one or more group definitions a reference to the new group definition.

15. The system of claim 10, wherein analyzing the one or more group definitions comprises identifying logic clauses that return either zero or all possible results, and wherein re-factoring the one or more group definitions comprises eliminating the identified logic clauses.

16. The system of claim 10, further configured to perform operations comprising receiving an instruction to modify an attribute of a group definition or an entity; and re-factoring the group definitions to reflect the modified attribute or entity.

17. The system of claim 10, further configured to perform operations comprising receiving and responding to a query for one or more of:
- a list of entities that belong to a specific group; or
- a list of groups to which a specific entity belongs.

18. The system of claim 10, wherein the logic clauses relate to business roles within an organization.

19. A computer-readable memory medium containing content that is configured, when executed, to control a computing system to perform operations comprising:
- maintaining a plurality of group definitions defining a plurality of groups, wherein the group definitions individually include one or more logic clauses that define membership in a corresponding group, wherein the one or more logic clauses, when evaluated, generate one or more data repository queries corresponding to the group which when executed indicate whether an entity is a member of one or more of the groups, and wherein the groups are either entitled to access the computer resource or not entitled to access the computer resource;
- analyzing, using a group management engine, one or more of the group definitions to determine inefficiently used logic clauses of the one or more logic clauses, wherein analyzing each of the one or more of the group definitions includes parsing the group definitions into a rule tree using a group definition compiler and analyzing one or more tables produced by the rule tree for each of the following conditions:
  - whether a given logic clause of the group definition is over-used,
  - whether a given logic clause of the group definition is under-used, wherein a particular logic clause is under-used if the particular logic clause is not called for a given period of time and the group associated with the particular logic clause can be formed using one or more other logic clauses, and
  - whether a given logic clause of the group definition is inaccurate;
- in response to determining that one or more logic clauses satisfies a condition of being under-used, over-used, or inaccurate logic clauses, re-factoring the one or more group definitions by eliminating the inefficiently used logic clauses, wherein refactoring eliminates the inefficiency by replacing one or more logic clauses in a rule tree or by writing one or more new logic clauses as a new rule tree; and
- using the refactored group definitions to assign entitlements to each of the plurality of groups such that members of each group that receives particular entitlements are provided with access to computer resources provisioned based on the assigned entitlements.

* * * * *